US011531663B2

(12) United States Patent
Potharaju et al.

(10) Patent No.: US 11,531,663 B2
(45) Date of Patent: Dec. 20, 2022

(54) AGENT-BASED DATA PRE-PROCESSING AND DATA INDEXING FOR EFFICIENT DATA RETRIEVAL

(71) Applicant: Microsoft Technology Licensing, LLC, Redmond, WA (US)

(72) Inventors: Rahul Potharaju, Redmond, WA (US); Terry Y. Kim, Bellevue, WA (US); Wentao Wu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 96 days.

(21) Appl. No.: 16/859,733

(22) Filed: Apr. 27, 2020

(65) Prior Publication Data

US 2021/0334256 A1  Oct. 28, 2021

(51) Int. Cl.
*G06F 7/00* (2006.01)
*G06F 16/00* (2019.01)
*G06F 16/22* (2019.01)
*G06F 16/248* (2019.01)
*G06F 16/245* (2019.01)

(52) U.S. Cl.
CPC ........ *G06F 16/2228* (2019.01); *G06F 16/245* (2019.01); *G06F 16/248* (2019.01)

(58) Field of Classification Search
CPC ... G06F 16/248; G06F 16/245; G06F 16/2228
USPC ....................................................... 707/741
See application file for complete search history.

(56) References Cited

U.S. PATENT DOCUMENTS

| 10,671,585 | B2 * | 6/2020 | Dhuse | G06F 16/221 |
| 10,740,474 | B1 * | 8/2020 | Ghetti | H04L 9/3242 |
| 2003/0204515 | A1 * | 10/2003 | Shadmon | G06F 16/30 |
| 2005/0038798 | A1 * | 2/2005 | Sample | G06F 16/322 |
| 2012/0047164 | A1 * | 2/2012 | Saadat | G06F 16/24542 |
| | | | | 707/769 |

(Continued)

OTHER PUBLICATIONS

"Apache spark", Retrieved from: https://github.com/apache/spark, Retrieved Date: Feb. 28 2020, 7 Pages.

(Continued)

*Primary Examiner* — Tuan A Pham
(74) *Attorney, Agent, or Firm* — Fiala & Weaver P.L.L.C.

(57) ABSTRACT

Methods, systems, apparatuses, and computer program products are directed to the generation of a global index structure. Agents executing on different data sources locally pre-process (e.g., format, filter, compress, encode, serialize etc.) data generated thereby and index such data. The agents also manage the resources thereof to perform the pre-processing and indexing operations. Each index generated by an agent is formatted as a plurality of index nodes. The index nodes and pre-processed data are provided to backend server(s) that maintain the global index structure and store the data in a globally distributed file system, which aid in unexpected disaster recovery. The backend server(s) generate the global index structure based on the index nodes. As new index nodes are received by the backend servers, the backend servers merge the newly-received index nodes with the global index structure. Global index structure traversal techniques for retrieving search keys are also described herein.

20 Claims, 12 Drawing Sheets

(56) References Cited

U.S. PATENT DOCUMENTS

| | | | | |
|---|---|---|---|---|
| 2013/0036115 | A1* | 2/2013 | Schwarz | G06F 16/219 |
| | | | | 707/736 |
| 2013/0232152 | A1* | 9/2013 | Dhuse | G06F 16/2228 |
| | | | | 707/741 |
| 2013/0304746 | A1* | 11/2013 | Dhuse | G06F 11/1096 |
| | | | | 707/743 |
| 2014/0115009 | A1* | 4/2014 | Lashley | G06F 16/2453 |
| | | | | 707/797 |
| 2015/0254303 | A1* | 9/2015 | Saadat | G06F 16/2228 |
| | | | | 707/716 |
| 2016/0335299 | A1* | 11/2016 | Vemulapati | G06F 16/2246 |
| 2017/0193023 | A1* | 7/2017 | Dhuse | G06F 3/0653 |
| 2018/0341672 | A1* | 11/2018 | Yamazaki | G06F 16/2228 |
| 2019/0179933 | A1* | 6/2019 | Wang | G06F 16/2272 |

OTHER PUBLICATIONS

"Azure Synapse Analytics", Retrieved from: https://docs.microsoft.com/en-us/azure/sql-data-warehouse/, Retrieved Date: Feb. 28, 2020, 4 Pages.

"Event Hubs", Retrieved From : https://azure.microsoft.com/en-us/services/event-hubs/:, Retrieved On: Feb. 28, 2020, 7 Pages.

"How Much Does 1 Hour of Downtime Cost the Average Business?", Retrieved from: https://goo.gl/fqqvTW, Retrieved Date: Mar. 6, 2020, 7 Pages.

"Questioning the lambda architecture", Retrieved from: https://www.oreilly.com/radar/questioning-the-lambda-architecture/, Retrieved Date: Mar. 6, 2020, 15 Pages.

"Rotating devops role improves engineering service quality", Retrieved from: https://goo.gl/x63caG, Mar. 6, 2017, pp. 1-5.

"Safeguard individual privacy with cloud services from Microsoft", Retrieved from: https://www.microsoft.com/en-us/trust-center/privacy/gdpr-overview, Published Date: Mar. 6, 2017, 4 Pages.

"Site reliability engineering", Retrieved from: https://goo.gl/YwqcQL, Retrieved Date: Mar. 6, 2020, 4 Pages.

"What will we do when the world's data hits 163 zettabytes in 2025?", Retrieved from: https://www.itechdude.com/itech/cloud-computing/what-will-we-do-when-the-world-s-data-hits-163-zettabytes-in-2025, Apr. 13, 2017, 4 Pages.

Abadi, et al., "Aurora: a new model and architecture for data stream management", In International Journal on Very Large Data Bases, vol. 12 Issue 2, Aug. 2003, pp. 120-139.

Agrawal, et al., "Automated selection of materialized views and indexes in SQL databases", In Proceedings of the 26th International Conference on Very Large Data Bases, Sep. 10, 2000, pp. 496-505.

Agrawal, et al., "Integrating Vertical and Horizontal Partitioning into Automated Physical Database Design", In Proceedings of the ACM SIGMOD international conference on Management of data, Jun. 13, 2004, 12 Pages.

Aiyer, et al., "Storage infrastructure behind Facebook messages: Using HBase at scale", In Journal of IEEE Data Eng., vol. 35, Issue 2, Jun. 2012, pp. 1-10.

Akidau, et al., "MillWheel: fault-tolerant stream processing at internet scale", In Journal VLDB Endowment vol. 6, Issue 11, Aug. 27, 2013, pp. 1033-1044.

Akidau, et al., "The Dataflow Model: A Practical Approach to Balancing Correctness, Latency, and Cost in Massive-Scale, Unbounded, Out-of-Order Data Processing", In Proceedings of the VLDB Endowment, vol. 8, Issue 12, Aug. 2015, pp. 1792-1803.

Armbrust, et al., "Spark SQL: Relational data processing in Spark", In Proceedings of ACM SIGMOD International Conference on Management of Data, May 31, 2015, pp. 1383-1394.

Armbrust, et al., "Structured streaming: A declarative api for real-time applications in apache spark", In Proceedings of the International Conference on Management of Data, Jun. 10, 2018, pp. 601-613.

Assuncao, et al., "Distributed data stream processing and edge computing: A survey on resource elasticity and future directions", In Journal of Network and Computer Applications, Feb. 1, 2018, pp. 1-24.

Bailis, et al., "Demonstration: MacroBase, A Fast Data Analysis Engine", In Proceedings of the ACM International Conference on Management of Data, May 14, 2017, pp. 1699-1702.

Baker, et al., "Megastore: Providing Scalable, Highly Available Storage for Interactive Services", In proceedings of the 5th Biennial Conference on Innovative Data Systems Research, Jan. 9, 2011, pp. 223-229.

Bernstein, et al., "Hyder-A Transactional Record Manager for Shared Flash", In Proceedings of the 5th Biennial Conference on Innovative Data Systems Research, Jan. 9, 2011, 12 Pages.

Bingmann, et al., "Thrill: High-Performance Algorithmic Distributed Batch Data Processing with C++", In Proceedings of IEEE International Conference on Big Data, Dec. 5, 2016, 15 Pages.

Bykov, et al., "Orleans: cloud computing for everyone", In Proceedings of the 2nd ACM Symposium on Cloud Computing, Oct. 27, 2011, 14 Pages.

Calder, et al., "Windows Azure Storage: A Highly Available Cloud Storage Service with Strong Consistency", In Proceedings of the Twenty-Third ACM Symposium on Operating Systems Principles, Oct. 23, 2011, pp. 143-157.

Carbone, et al., "Apache Flink: Stream and Batch Processing in a Single Engine", In Bulletin of the IEEE Computer Society Technical Committee on Data Engineering, vol. 36, Issue 4, Dec. 2015, pp. 28-38.

Chaiken, et al., "SCOPE: easy and efficient parallel processing of massive data sets", In Proceedings of the VLDB Endowment vol. 1, Issue 2, Aug. 23, 2008, pp. 1265-1276.

Chandramouli, et al., "Quill: Efficient, transferable, and rich analytics at scale", In Proceedings of the VLDB Endowment, vol. 9, Issue 14, Oct. 2016, pp. 1623-1634.

Chandramouli, et al., "Trill: A high-performance incremental query processor for diverse analytics", In Proceedings of the VLDB Endowment vol. 8, Issue 4, Dec. 2014, pp. 401-412.

Chang, et al., "Bigtable: A Distributed Storage System for Structured Data", In Journal of ACM Transactions on Computer Systems, vol. 26, Issue 2, Jun. 2008, 26 Pages.

Chao, MT., "A general purpose unequal probability sampling plan", In Journal of Biometrika, vol. 69, Issue 3, Dec. 1, 1982, pp. 653-656.

Chaudhuri, et al., "An Efficient Cost-Driven Index Selection Tool for Microsoft SQL Server", In Proceedings of the 23rd International Conference on Very Large Data Bases, Aug. 25, 1997, pp. 146-155.

Chen, et al., "Failure Diagnosis Using Decision Trees", In Proceedings of International Conference on Autonomic Computing, May 17, 2004, pp. 36-43.

Cheng, et al., "A survey on algorithms for mining frequent itemsets over data streams", In Journal of Knowledge and Information Systems, Jul. 1, 2008, 27 Pages.

Comer, Douglas, "The Ubiquitous B-Tree", In Computing Surveys, vol. 11, Issue 2, Jun. 1979, pp. 121-137.

Cooper, et al., "PNUTS: Yahoo!'s Hosted Data Serving Platform", In Proceedings of the VLDB Endowment, Aug. 24, 2008, 12 Pages.

Cormode, et al., "Exponentially decayed aggregates on data streams", In Proceedings of IEEE 24th International Conference on Data Engineering, Apr. 7, 2008, 3 Pages.

Cormode, et al., "Synopses for Massive Data: Samples, Histograms, Wavelets, Sketches", In Journal of Foundations and Trends in Databases, vol. 4, No. 1-3, Jan. 1, 2012, pp. 1-294.

Decandia, et al., "Dynamo: Amazon's Highly Available Key-value Store", In Proceedings of twenty-first ACM SIGOPS symposium on Operating systems principles, Oct. 14, 2007, pp. 205-220.

Dewitt, et al., "Split Query Processing in Polybase", In Proceedings of the ACM SIGMOD International Conference on Management of Data, Jun. 22, 2013, 12 Pages.

Dewitt, David J.., "The Gamma Database Machine Project", In Journal of Transactions on Knowledge and Data Engineering, vol. 2, Issue 1, Mar. 1990, 38 Pages.

Diaconu, et al., "Hekaton: SQL Server's memory-optimized OLTP engine", In Proceedings of the ACM SIGMOD International Conference on Management of Data, Jun. 22, 2013, pp. 1243-1254.

Ghemawat, et al., "The Google File System", In Proceedings of the 19th ACM SIGOPS Operating Systems review, vol. 37, Issue 5, Oct. 19, 2003, pp. 29-43.

(56) References Cited

OTHER PUBLICATIONS

Kraska, et al., "The Case for Learned Index Structures", In Proceedings of the International Conference on Management of Data, May 27, 2018, pp. 489-504.
Kreps, et al., "Kafka: a Distributed Messaging System for Log Processing", In Proceedings of 6th International Workshop on Networking Meets Databases (NetDB), Co-located with SIGMOD 2011, Jun. 12, 2011, 7 pages.
Lakshman, et al., "Cassandra: A Decentralized Structured Storage System", In Journal of ACM SIGOPS Operating Systems Review, vol. 44, Issue 2, Apr. 14, 2010, 6 Pages.
Lamport, Leslie, "Paxos Made Simple", In Journal of ACM Sigact News, vol. 32, Issue 4, Dec. 2001, 14 Pages.
Lamport, Leslie, "The Part-Time Parliament", In Journal of ACM Transactions on Computer Systems, vol. 16, Issue 2, May 1998, pp. 133-169.
Lemire, et al., "Roaring bitmaps: Implementation of an optimized software library", In Journal of Software: Practice and Experience., Apr. 2018, pp. 1-34.
Lemire, et al., "Sorting improves word-aligned bitmap indexes", In Journal of Data & Knowledge Engineering, vol. 69, Issue 1, Jan. 1, 2010, pp. 1-43.
Levandoski, et al., "Deuteronomy: Transaction Support for Cloud Data", In Proceedings of the Fifth Biennial Conference on Innovative Data Systems Research, Jan. 9, 2011, pp. 123-133.
Mai, et al., "Chi: a scalable and programmable control plane for distributed stream processing systems", In Proceedings of the VLDB Endowment, vol. 11, Issue 10, Jun. 1, 2018, pp. 1303-1316.
Mai, et al., "NetAgg: Using Middleboxes for Application-specific On-path Aggregation in Data Centres", In Proceedings of the 10th ACM International on Conference on emerging Networking Experiments and Technologies, Dec. 2, 2014, pp. 249-261.
Merkle, Ralph, "A digital signature based on a conventional encryption function", In Proceedings of the International Cryptology Conference (CRYPTO), Aug. 16, 1987, pp. 369-378.
Mohammadi, et al., "Deep learning for iot big data and streaming analytics: A survey.", In Journal of IEEE Communications Surveys & Tutorials, vol. 20, Issue 4, Jun. 6, 2018, pp. 1-40.

O'Neil, et al., "The log-structured merge-tree (LSM-tree)", In Journal of Acta Informatica, vol. 33, Issue 4, Jun. 1996, pp. 1-32.
Oki, et al., "Viewstamped replication: A new primary copy method to support highly-available distributed systems", In Proceedings of Seventh Annual ACM Symposium on Principles of Distributed Computing, Aug. 15, 1988, pp. 8-17.
Pavlo, et al., "Self-driving database management systems", In Proceedings of 8th Biennial Conference on Innovative Data Systems Research, Jan. 8, 2017, 6 Pages.
Ramakrishnan, et al., "Azure Data Lake Store: A Hyperscale Distributed File Service for Big Data Analytics", In Proceedings of the ACM International Conference on Management of Data, May 14, 2017, pp. 51-63.
Ramakrishnan, et al., "Database management systems (3. ed.)", In Publication of McGraw-Hill, 2003, 1098 Pages.
Renesse, et al., "Chain replication for supporting high throughput and availability", In Proceedings of the 6th conference on Symposium on Opearting Systems Design & Implementation—vol. 6, Dec. 6, 2004, 14 Pages.
Selinger, et al., "Access path selection in a relational database management system", In Proceedings of the ACM SIGMOD international conference on Management of data, May 30, 1979, pp. 23-34.
Shvachko, et al., "The hadoop distributed file system", In Proceedings of IEEE 26th symposium on mass storage systems and technologies, May 3, 2010, pp. 1-10.
Toshniwal, et al., "Storm@ twitter", In Proceedings of the ACM SIGMOD international conference on Management of data, Jun. 22, 2014, pp. 147-156.
Verbitski, et al., "Amazon aurora: Design considerations for high throughput cloud-native relational databases", In Proceedings of the ACM International Conference on Management of Data, May 9, 2017, pp. 1041-1052.
Zaharia, et al., "Discretized streams: fault-tolerant streaming computation at scale", In Proceedings of the Twenty-Fourth ACM Symposium on Operating Systems Principles, Nov. 3, 2013, pp. 423-438.

* cited by examiner

AGENT-BASED DATA PRE-PROCESSING AND DATA INDEXING FOR EFFICIENT DATA RETRIEVAL

BACKGROUND

It is estimated that the amount of data worldwide will grow from 0.8 to 164 Zettabytes this decade. As an example, Microsoft's Azure® Data Lake Store (a scalable data storage and analytics service) already holds many exabytes and is growing rapidly. Users seek ways to focus on the finer details they really need, but without getting rid of the original data. This is a non-trivial challenge because a single dataset can be used for answering a multitude of questions. As an example, telemetry (e.g., logs, heartbeat information) from various services are stored and analyzed to support a variety of developer tasks (e.g., monitoring, reporting, debugging). With the monetary cost of downtime ranging from $100 k to millions of dollars per hour, real-time processing and querying of this service data becomes critical.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are directed to the generation of a global index structure. Agents executing on different data sources locally pre-process data generated thereby and index such data. Each index generated by an agent is formatted as a plurality of index nodes. The index nodes are provided to backend server(s) that maintain the global index structure. The backend server(s) generate the global index structure based on the index nodes received by the data sources. As new index nodes are received by the backend servers, the backend servers merge the newly-received index nodes with the global index structure. Global index structure traversal techniques for retrieving search keys are also described herein. Such traversal techniques advantageously limit the number of index nodes that are required to be searched, thereby greatly increasing the speed at which query results are returned (i.e., the read access time is greatly decreased), while also limiting the processing cycles required to find and return such search keys.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further explain the principles of the embodiments and to enable a person skilled in the relevant art(s) to make and use the embodiments.

Figure 1:
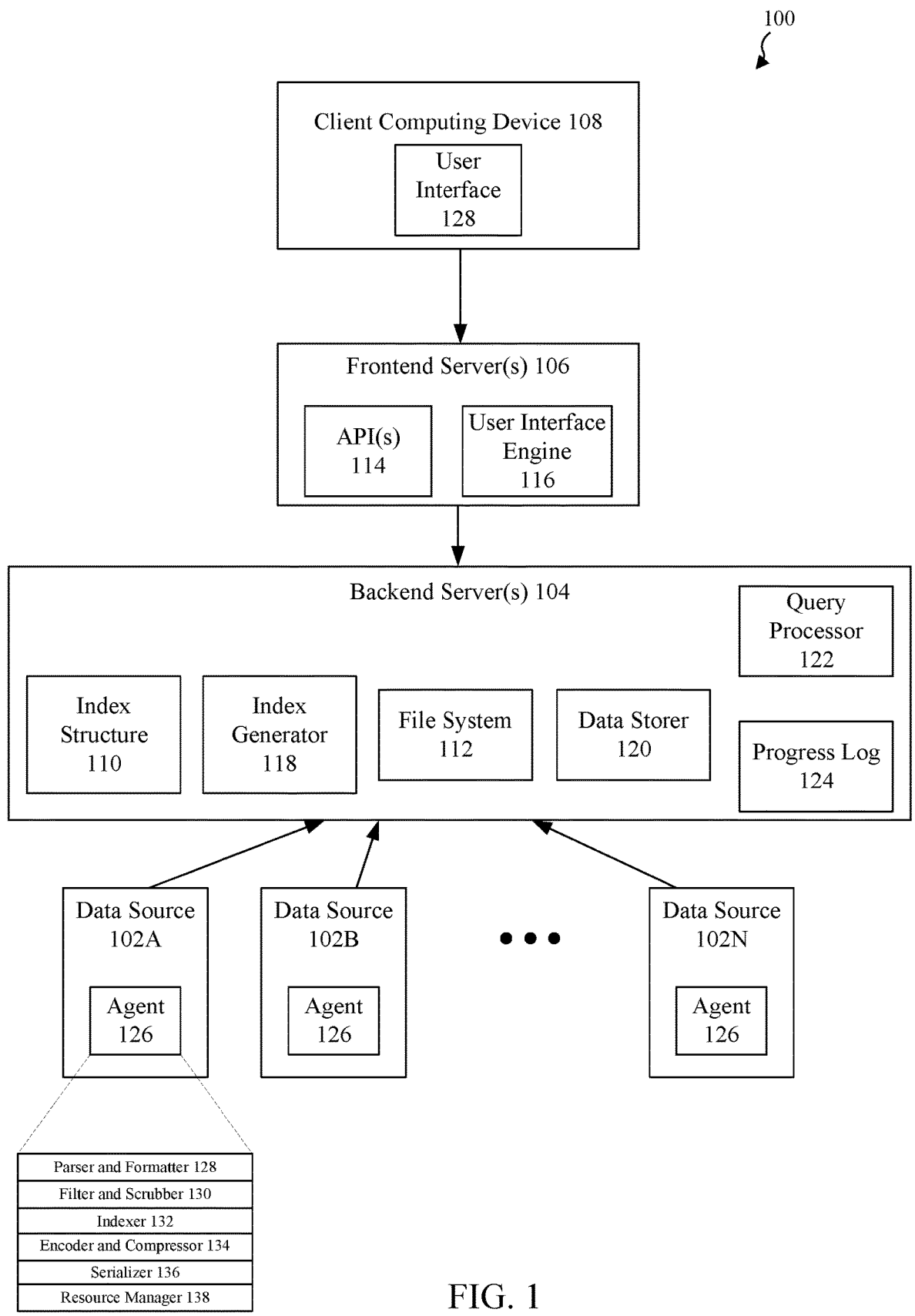
FIG. 1 is a block diagram of a system for data ingestion and indexing in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s)

to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Embodiments described herein are directed to the generation and traversal of a global index structure. Agents executing on different data sources locally pre-process data generated thereby and index such data. The index is formatted as a plurality of index nodes. The index nodes are provided to backend server(s) that maintain the global index structure. The backend server(s) generate the global index structure based on the index nodes received by the data sources. As new index nodes are received by the backend servers, the backend servers merge the newly-received index nodes with the global index structure.

Building an index is computationally intensive. For example, trillions of search keys may be indexed in any given day. By offloading the data processing and index generation to the data sources, the backend server(s) can be reserved to perform relatively cheaper operations, such as index management. Accordingly, the number of backend server(s) required to maintain a global index structure is dramatically reduced, thus reducing the number of compute resources (e.g., memory, central processing units (CPUs), power, etc.) required for the backend server(s). Moreover, the index provided by the data sources and to the backend server(s) may be compressed, thereby reducing the network bandwidth required to transmit the index to the backend server(s).

In addition, as will be described herein, the index structure traversal techniques for retrieving search keys described herein limit the number of index nodes that are required to be searched, thereby greatly increasing the speed at which query results are returned (i.e., the read access time is greatly decreased), while also limiting the processing cycles required to find and return such search keys. This provides several benefits.

For example, consider a scenario in which a large parallel data cluster is utilized to store a vast amount of data. In such large systems, problems become more of a norm than an exception. Consequently, debugging such problems becomes very difficult due to the complexity of the system and the scale of the log information (e.g., 10 s of petabytes per day) being collected. It is imperative that such log information is quickly located and retrieved for debugging purposes to limit the downtime of such systems. The indexing and traversal techniques described herein advantageously fulfill such requirements. For instance, it has been observed that the techniques described herein make hundreds of terabytes of data (e.g. log information) available for queries (via an index structure) under 1.5 minutes and provide query latency times of less than 1 minute.

II. Example Embodiments

FIG. 1 is a block diagram of a computing system 100 for data ingestion and indexing in accordance with an example embodiment. As shown in FIG. 1, system 100 comprises data sources 102A-102N, one or more backend servers 104, one or more frontend servers 106, and a client computing device 108. Each of data sources 102A-102N comprise an agent 126. Agents 126 are configured to provide data generated by one or more computing processes (e.g., applications, services, etc.) executing on data source(s) 102A-102N to backend server(s) 104. The data may comprise any type of information, including, but not limited to, diagnostic information (e.g., debug log files, heartbeat information, etc.), demographic information (e.g., age, gender, location, etc.) associated with any number of users, a usage history associated with one or more devices and/or software applications associated with each of the plurality of users, purchase activity associated with each of the plurality of users (e.g., device purchases, software application purchases, etc.), advertising campaigns associated with each of the plurality of users (e.g., advertisements that have been targeted to each of the plurality of users, advertisements that have been interacted with (e.g., viewed, clicked on, etc.) by each of the plurality of users, logs generated by applications executed thereon, etc. Examples of data sources 102A-102N include, but are not limited, a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), a stationary computing device such as a desktop computer or PC (personal computer) or a server, Internet-of-Things (IoT) devices, a database server, a server located in a cloud services platform (also referred to as a node or compute), etc.

The data generated by a particular data source of data sources 102A-102N may be organized as one or more records. A group of one or more records is referred to as a data block. Data records may be grouped in uniform fashion, by using fixed-size (e.g., 100 records per data block) or fixed-time (e.g., a new data block every 1 minute) policies, although the embodiments described herein are not so limited.

In accordance with an embodiment, agent 126 performs various pre-processing operations before transmitting the data to backend server(s) 104. For example, as shown in FIG. 1, agent 126 comprises a parser and formatter 128, a filter and scrubber 130, an indexer 132, an encoder and compressor 104, and a serializer 136.

Parser and formatter 128 may be configured to parse and/or format the data in accordance with a particular format (e.g., a format utilized by backend server(s) 104). The format may be user-specified or pre-determined. For example, parser and formatter 128 may parse the data to determine various data fields and format the data as a delimiter-separated file, where each data field is separated by a delimiter, such as a comma. In another example, parser and formatter 128 may format the data in accordance with a JavaScript Object Notation (JSON) format. In yet another example, parser and formatter 128 may format the data in accordance with a binary format, such as, but not limited to a column-major format such as ORC (Optimized Row Columnar) file format, a Parquet file format, or a row-major format such as AVRO etc. It is noted that parser and formatter 128 may parse and format data using a variety of techniques and formats and that the techniques and formats described herein are purely exemplary.

Filter and scrubber 130 may be configured to filter (or "scrub") the data before sending the data to backend server(s) 104. Filter and scrubber 130 may filter out certain data in accordance with one or more predetermined or user-defined patterns or thresholds. For example, filter and scrubber 130 may filter out confidential (or privacy-sensitive) information (e.g., social security numbers, credit card information, etc.) and/or replace such data with randomized data. It is noted that filter and scrubber 130 may filter the data in accordance with any pattern or threshold and the patterns and thresholds described herein are purely exemplary.

Agents 126 are further configured to index the data transmitted to backend server(s) 104. For instance, indexer 132 may parse the data before it is sent to backend server(s) 104 and determine search keys based on the data. Each of the search keys is associated with location information that specifies the location and/or identification of the data corresponding to the search key (e.g., a location and/or identification of the record in which the search key is included). For instance, the location information may specify a uniform resource identifier that specifies a row identifier (e.g., a row ID) inside the data block in which the search key is included. Indexer 132 may use various techniques to index the data. For example, indexer 132 may perform a selective indexing, full-text indexing, wavelet tree-based indexing, pre-aggregation-based (holistic or non-holistic) indexing, etc.

Agents 126 may each perform additional pre-processing on the data and/or index before transmitting the data and/or index to backend server(s) 104. For example, serializer 136 may be configured to serialize the data in accordance with a particular format. The format may be user-defined or predetermined. For instance, serializer 136 may serialize the data in accordance with a row-major or column-major format. It is noted that serializer 136 may serialize the data in accordance with any serialization technique and the serialization technique described herein is purely exemplary.

Encoder and compressor 134 may be configured to encode the data and/or index in accordance with a particular format and compress the data and/or index. For instance, encoder and compressor 134 may use various techniques to encode and/or compress the index and or data. Examples of encoding techniques include, but are not limited to, PFOR (Patched Frame of Reference, delta-based encoding, dictionary-based encoding, etc.). Examples of compression techniques include, but are not limited, LZ4-based compression techniques, snappy-based compression techniques, ZStd-based compression techniques, etc.

Each of agents 126 may also be configured to manage the resources thereof to perform the various operations described herein. For example, as shown in FIG. 1, each of agents 126 also comprises a resource manager 138. Resource manager 138 may be configured to allocate certain resources of its corresponding data source (e.g., data sources 102A-102N) for each of the agent operations described herein. For instance, resource manager 138 may allocate a first set of resources to perform parsing and/or formatting, allocate a second set of resources to perform filtering/scrubbing, allocate a third set of resources to perform indexing, allocate a fourth set of resources to perform encoding and/or compressing, and allocate a fifth set of resources to perform serialization. By doing, resource manager 138 places constraints on the resources that are being utilized by any of such operations, thereby ensuring that one operation is not being starved of resources by another operation. Examples of resources include, but are not limited to, central processing units (CPUs) or CPU cores, memory, storage, etc. The amount of resources that are allocated for a particular operation may be user-configurable.

As will be described below, the index generated by agents 126 is merged with a global index maintained by backend server(s) 104. In accordance with an embodiment, each of agents 126 (e.g., parser and formatter 128 of agents 126) formats the index in accordance with an index format utilized by backend server(s) 104. For instance, in an embodiment in which the global index is hierarchical, each of agents 126 formats the index into a plurality of index nodes, where each index node comprises the search key-to-location information mapping. Each of agents 126 may generate an index node for each data block of data.

Backend server(s) 104 (also referred to as "ingestion" servers) are configured to receive and store (i.e., ingest) the data received from data sources 102A-102N into a file system 112. For example, backend server(s) 104 comprise a data storer 120 that receives data from data sources 102A-102N and stores the data in a file system 112 maintained by backend server(s) 104. File system 112 stores the received data as tables of records. Each data block of records is associated with a handle (e.g., a uniform resource identifier (URI)) that can be used to efficiently retrieve the data block. In accordance with an embodiment, file system 112 is a file system that is distributed among various ones of backend server(s) 104 (i.e., file system 112 is a global distributed file system). Examples of distributed file systems include, but are not limited to Azure® Data Lake owned by Microsoft® Corporation of Redmond, Wash., Azure® Blob Storage owned by Microsoft® Corporation of Redmond, Wash., etc. Storing the data in a globally distributed file system advantageously aids with unexpected disaster recovery.

Backend server(s) 104 are also configured to receive the index generated by agents 126 and generate and maintain global index representative of the data collected from data sources 102A-102N and stored in file system 112. the index with an index structure 110 maintained thereby. For example, backend server(s) 104 comprise an index generator 118 that receives the index from agents 126 and generates an index structure 110. As new data and indices are received from agents 126 over time, the new data is stored in file system 112, and the new indices are merged with the currently existing index structure 110. In accordance with an embodiment, index structure 110 is implemented as a hierarchical index structure 110, although the embodiments described herein are not so limited. In accordance with such an embodiment, index structure 110 is a global index that is distributed between various ones of backend server(s) 104 (i.e., index structure 110 is a distributed global index). Backend server(s) 104 may be co-located in the same datacenter, but within different fault-tolerance domains. This ensures that backend server(s) 104 have fast access to the underlying data and also increases availability and reliability. In an embodiment in which the data and/or index received from agents 126 is encoded and/or compressed, index generator 118 decoded and/or decompresses the data and/or index before incorporating the index into index structure 110 and storing the data in file system 112.

For each search key maintained by index structure 110, index structure 110 associates location information (e.g., pointers), which specifies a location of data blocks from which corresponding search key(s) are retrievable. Accordingly, the content of an index node may be presented as a collection of pairs <K,P>, where K is a search key and P is a set of pointers. In accordance with an embodiment, the location information comprises a pointer to a path to one or more files located in file system 112 that store the data block comprising the search key. In accordance with another embodiment, the location information comprises a pointer to offsets inside the file(s) located in file system 112 that locate addressable data blocks comprising the search key.

Progress log 124 keeps track of the data blocks that have been stored in file system 112, but have not yet been indexed via index structure 110. For instance, after data blocks are stored in file system 112, data storer 120 writes to progress log 124 an indication of the data blocks that have been stored in file system 112 and location information that specifies the location at which the data blocks are stored in file system 112. Progress log 124 also keeps track of the data blocks that have been indexed via index structure 110. For instance, after index blocks are generated and incorporated into index structure 110, index generator 118 writes to progress log 124 an indication of the index blocks that have been generated and incorporated into index structure 110 and the data blocks referenced thereby. Any data block that is identified as being stored in file system 114 in progress log 124, but is not referenced by an index block are identified as data blocks for which data has not yet been indexed. Accordingly, progress log 124 tracks the progress of both data that has been ingested and stored in file system 114 and data that has been indexed via hierarchical index structure 112. Progress log 124 may identify the index nodes generated at a level-by-level basis. This effectively creates a watermark that records the latest data block being ingested, stored, and indexed at a particular level. As will be described below with reference to Subsection B, progress log 124 may be utilized to perform a hybrid query, which searches for search keys in both index nodes and the data blocks that have not yet been indexed.

Backend server(s) 104 may partition index structure 110 into different partitions. Indexed data may be distributed to different partitions by hashing on a user-specified partitioning key (e.g., a username, a date, etc.) or simply using round-robin distribution if no key is specified. Each partition may fall into its own reliability zone, with multiple replicas to ensure fault tolerance and improve availability. Index structure 110 allows for efficient ingestion and organization of extremely large datasets at a cost-efficient manner. Additional details regarding index structure 110 are described below in Subsection A.

Frontend server(s) 106 are configured to act as a frontend gateway that is responsible for authenticating and authorizing users to enable such users to query index structure 110. As shown in FIG. 1, frontend server(s) 106 expose a set of one or more API(s) 114 and comprises a user interface engine 116. API(s) 114 may be utilized to perform search queries for reading data maintained by file system 114 and indexed by index structure 110. In one implementation, such APIs 114 may include Representational stat REST APIs, although this is only a non-limiting example.

Queries may be initiated via a user interface 128 rendered on a display device of client computing device 108. User interface 128 may be rendered via user interface engine 116. Using user interface 128, a user is enabled to formulate and transmit queries to frontend server(s) 106. Frontend server(s) 106 utilize API(s) 114 to issue search queries to backend server(s) 104. Responsive to receiving search queries, a query processor 122 of backend server(s) 104 traverses index structure 110 for index nodes comprising search keys that are specified by the search queries. The location information included in such index nodes is utilized to retrieve data records comprising the search key from corresponding data blocks stored via file system 112. Additional details regarding index structure 110 traversal techniques are described below with reference to Subsection B. Query processor 122 returns the determined data records to frontend server(s) 106. API(s) 114 return the determined data records via a response to the search query. The determined data records are displayed to the user via user interface 128.

In accordance with at least one embodiment, data sources 102A-102N, backend server(s) 104 and/or frontend server(s) 106 comprise part of a cloud services platform (e.g., data sources 102A-102N, backend server(s) 104 and/or frontend server(s) 106 are nodes of a cloud services platform. An example of a cloud services platform includes, but is not limited to, the Microsoft® Azure® cloud computing platform, owned by Microsoft Corporation of Redmond, Wash.

A. Hierarchical Index Structure Generation

The following describes techniques for generating a hierarchical index structure and merging new indexes received from agents 126 into the hierarchical index structure. However, it is noted that the embodiments described herein are not so limited and that different index structures (and the merging techniques used to update such index structures) may be utilized without departing from the spirt and scope of the embodiments described herein.

Figure 2A:
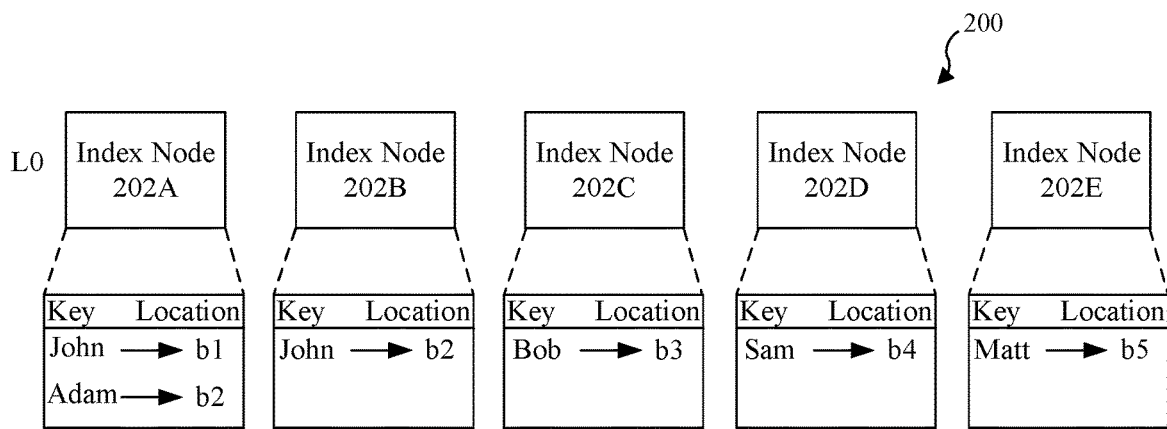
FIGS. 2A-2C depict the generation of a hierarchical index structure in accordance with an example embodiment.
Figure 2B:
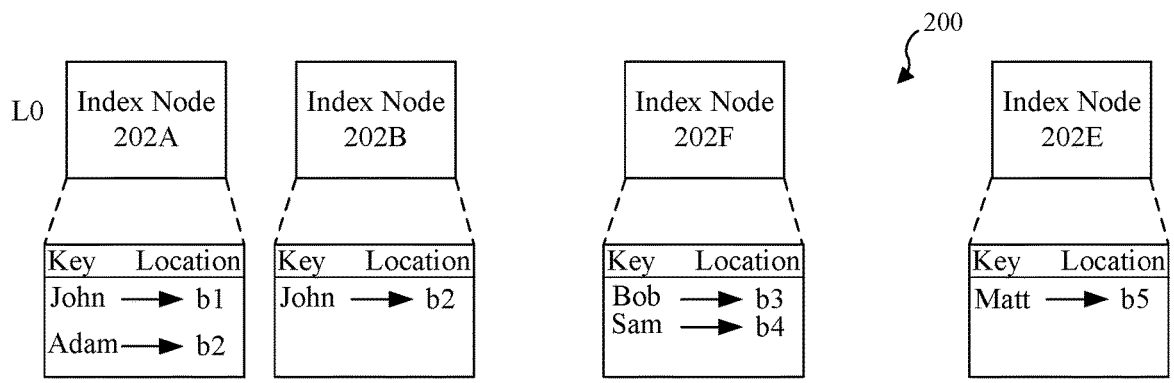
Figure 2C:
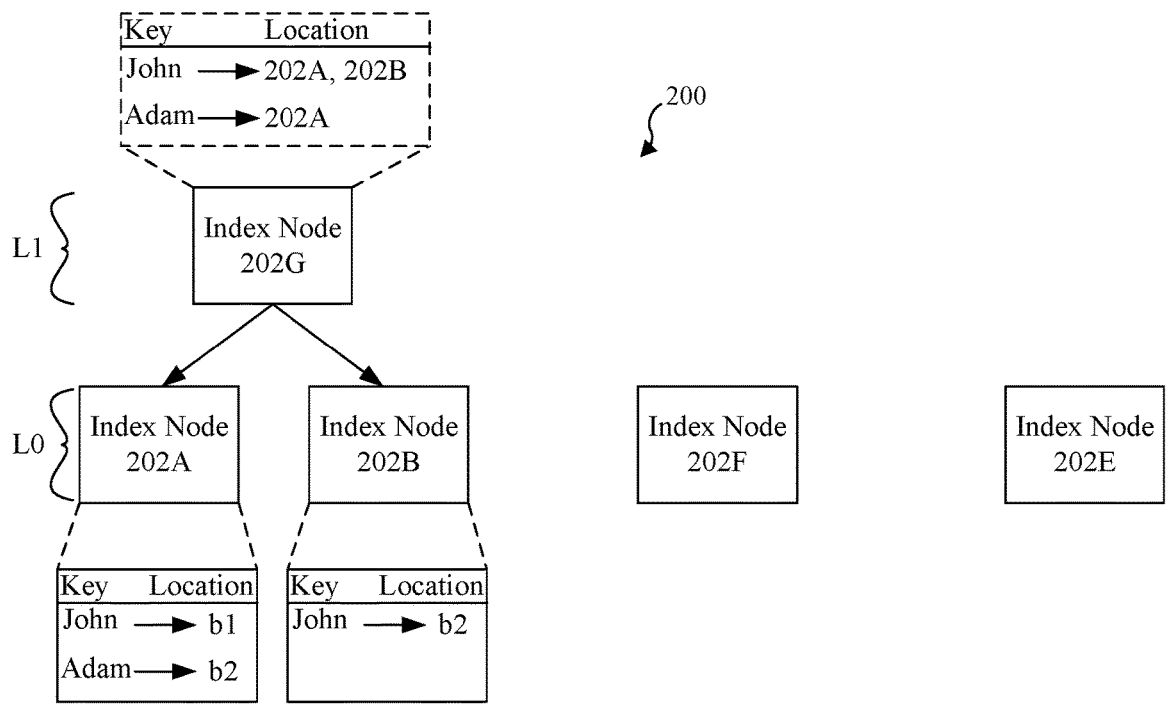

FIGS. 2A-2C depict the generation of a hierarchical index structure 200 in accordance with an example embodiment. Hierarchical index structure 200 is generated by index generator 118, as described above with reference to FIG. 1. Hierarchical index structure 200 is an example of index structure 110, as described above with reference to FIG. 1.

As shown in FIG. 2A, a plurality of index nodes 202A-202E are received via agents 126. After the data blocks from which index nodes 202A-202E are based are stored in file system 112, index generator 118 associates each search key included in index nodes 202A-202E with location information that identifies the location of the corresponding data block that comprises the search key. For instance, as shown in FIG. 2, index node 202A comprises search keys "John" and "Adam". Search key "Adam" is paired with location information that specifies that search key is found in data block 1 (b1), and search key "Adam" is paired with location information that specifies that search key is found in data block 2 (b2). Index node 202B comprises search key "John". Search key "John" is paired with location information that specifies that search key is found in data block 2 (b2). Index node 202C comprises search key "Bob". Search key "Bob" is paired with location information that specifies that search key is found in data block 3 (b3). Index node 202D comprises search key "Sam". Search key "Sam" is paired with location information that specifies that search key is found in data block 4 (b4). Index node 202E comprises search key "Matt". Search key "Matt" is paired with location information that specifies that search key is found in data block 5 (d5).

It is noted that the search keys described above are purely exemplary and that each of index nodes 202A-202E may comprise any number of search keys, including thousands or even millions of search keys.

After this initialization stage, any of leaf index nodes 202A-202E may be combined based on size and/or commonality. For instance, if two or more leaf index nodes have a size that is below a predetermined threshold (e.g., 64 MB), the subset of leaf index nodes may be merged (i.e., combined). Such an operation may be referred to as a "merge" operation. For example, as shown in FIG. 2A, index node 202C and index node 202D may each have a size that is below a predetermined threshold. Accordingly, index node 202C and index node 202D may be merged together to form a new index node. For example, as shown in FIG. 2B, index node 202C and index node 202D have been merged together to form index node 202F. Index node 202F comprises the search keys that were previously included in index nodes 202C and 202D (i.e., "Bob" and "Sam"), along with the location information paired with such search keys.

If two or more leaf index nodes comprise a number of duplicate search keys that exceed a predetermined threshold, a higher-level index node (i.e., an index node generated at a level higher at which such leaf index nodes are located) is generated that comprises the union of the search keys of the two or more leaf index nodes. Such an operation may be referred to as an "add" operation. The resulting index node points to each leaf index node of the two or more leaf index nodes, rather than to the locations of the data blocks in which the search keys are located. For example, as shown in FIG. 2B, index node 202A and index node 202B comprise duplicate search keys (i.e., "John"). Accordingly, a new index node is generated at a higher level of hierarchical index structure 200 that comprises the search keys of index nodes 202A and 202B. For example, as shown in FIG. 2C, index node 202G has been generated that comprises the search keys of index nodes 202A and 202B (i.e., "John" and "Adam"). Moreover, search key "John" is associated with (or points to) the index nodes (i.e., index nodes 202A and 202B) that comprise the location information specifying the data blocks where search key "John" is found. Search key "Adam" is associated with the index node (index node 202B) that comprises the location information specifying the data block where search key "Adam" is found. Accordingly, as shown in FIG. 2C, contrary to the "merge" operation described above, index nodes 202A and 202C are retained (i.e., they are not removed) after completion of the "add" operation.

Figure 3:
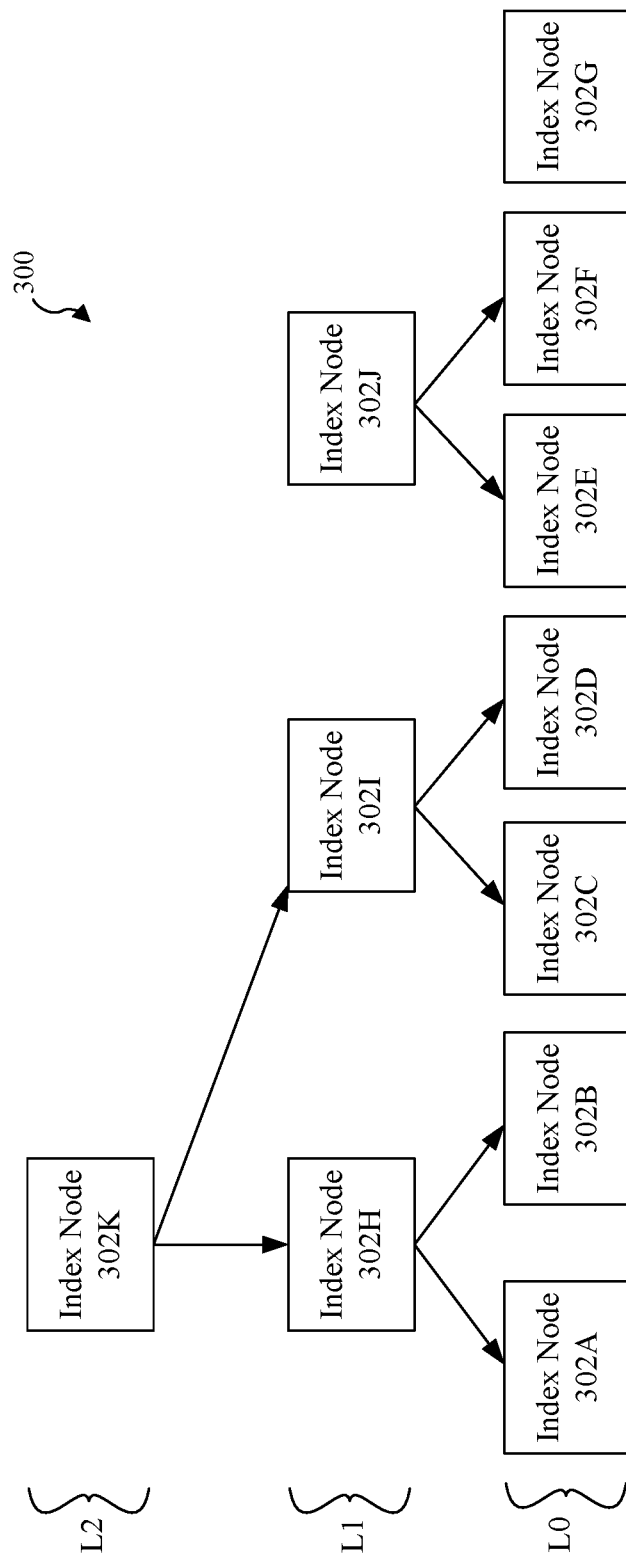
FIG. 3 depicts a hierarchical index structure in accordance with an example embodiment.

Index nodes may be added at higher levels until the size of the resulting node reaches a predetermined threshold. Due to the size-based policies described herein, a non-root index level may contain index nodes that are orphans, i.e., they do not have parent nodes in the next higher level. For example, FIG. 3 depicts a hierarchical index structure 300 comprising a plurality of levels (L0-L2) in accordance with an example embodiment. As shown in FIG. 3, hierarchical index structure 300 comprises a first level (L0) comprising index nodes 302A-302G, a second level (L1) comprising index nodes 302H-302J, and a third level (L2) comprising index node 302K. Add operations have been performed with respect to index nodes 302A and 302B to create index node 302H, with respect to index nodes 302C and 302D to create index node 302I, with respect to index nodes 302E and 302F to create index node 302J, and with respect to index nodes 302H-302I to create index node 302K. Index nodes 302K, 302J, and 302G are considered to be orphan nodes, as they are parentless (i.e., they do not have parents in the next higher level). Accordingly, hierarchical index structure 300 can be generalized to a directed acyclic graph (DAG), rather than a classic tree-like structure.

Figure 4A:
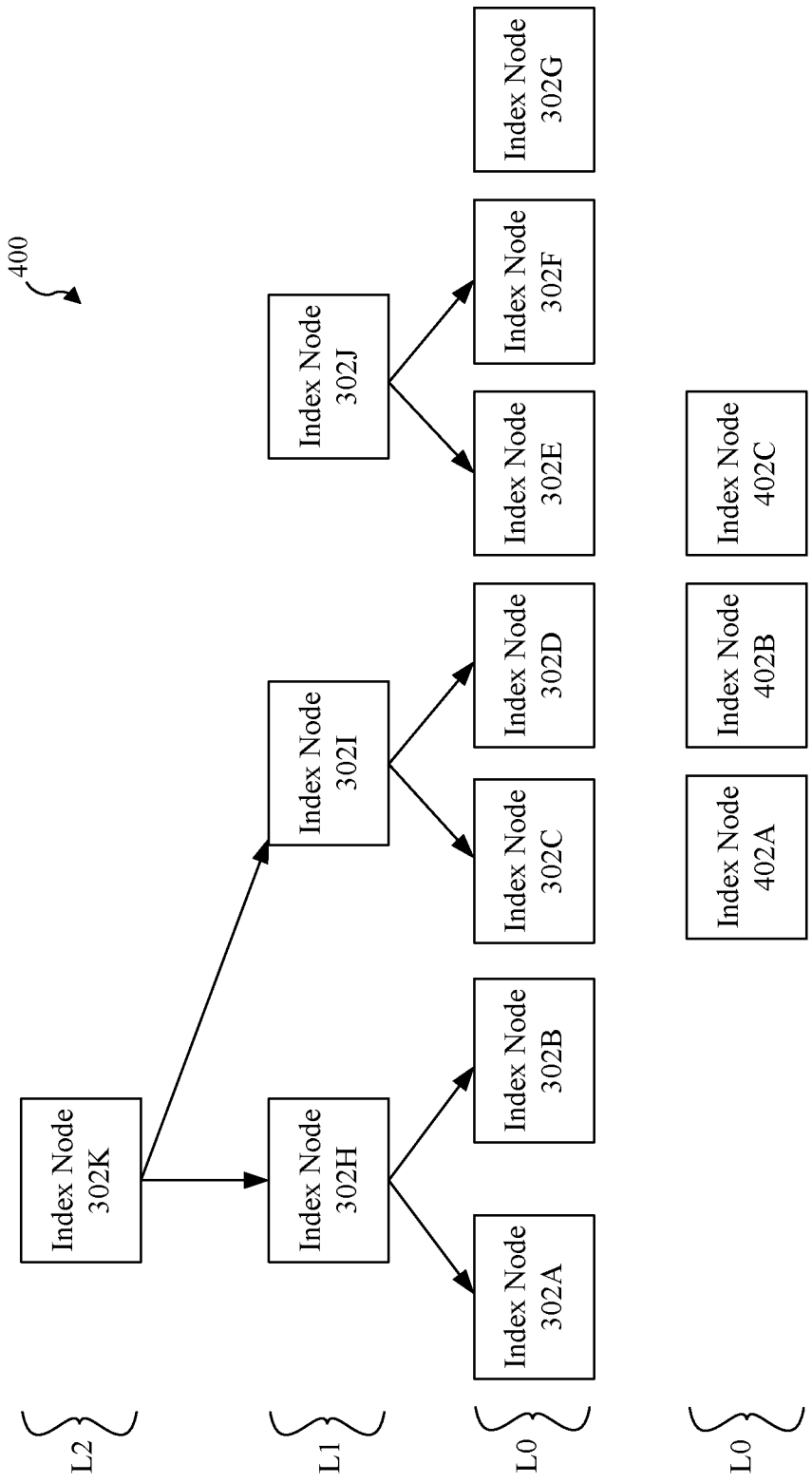
FIGS. 4A-4C depict a hierarchical index structure into which newly-received index nodes are incorporated in accordance with an example embodiment.

Any new index nodes received from agents 126 are combined with hierarchical index structure 300. Such index nodes may initially be incorporated in hierarchical index structure 300 as orphan nodes. For example, FIG. 4A depicts a hierarchical index structure 400 including additional index nodes received by data agents 126 in accordance with an example embodiment. As shown in FIG. 4A, hierarchical index structure 400 comprises index nodes 302A-302K, as described above with reference to FIG. 3. Hierarchical index structure 400 further comprises index nodes 402A-402C, which are subsequently received by data agents 126 after index nodes 302A-302K. As shown in FIG. 4A, index nodes 402A-402C are also included in the lowest level (i.e., L0) of hierarchical index structure 400 and are also orphan index nodes.

Each of index nodes 402A-402C may be merged with at least another index node of index nodes 402A-402C and/or index nodes 302-302G via a merge operation in a similar manner as described above with reference to FIG. 2B. For example, as shown in FIG. 4A, index node 302G and index node 402C may each have a size that is below a predetermined threshold. Accordingly, index node 302G and index node 402C may be merged together to form a new index node.

Figure 4B:
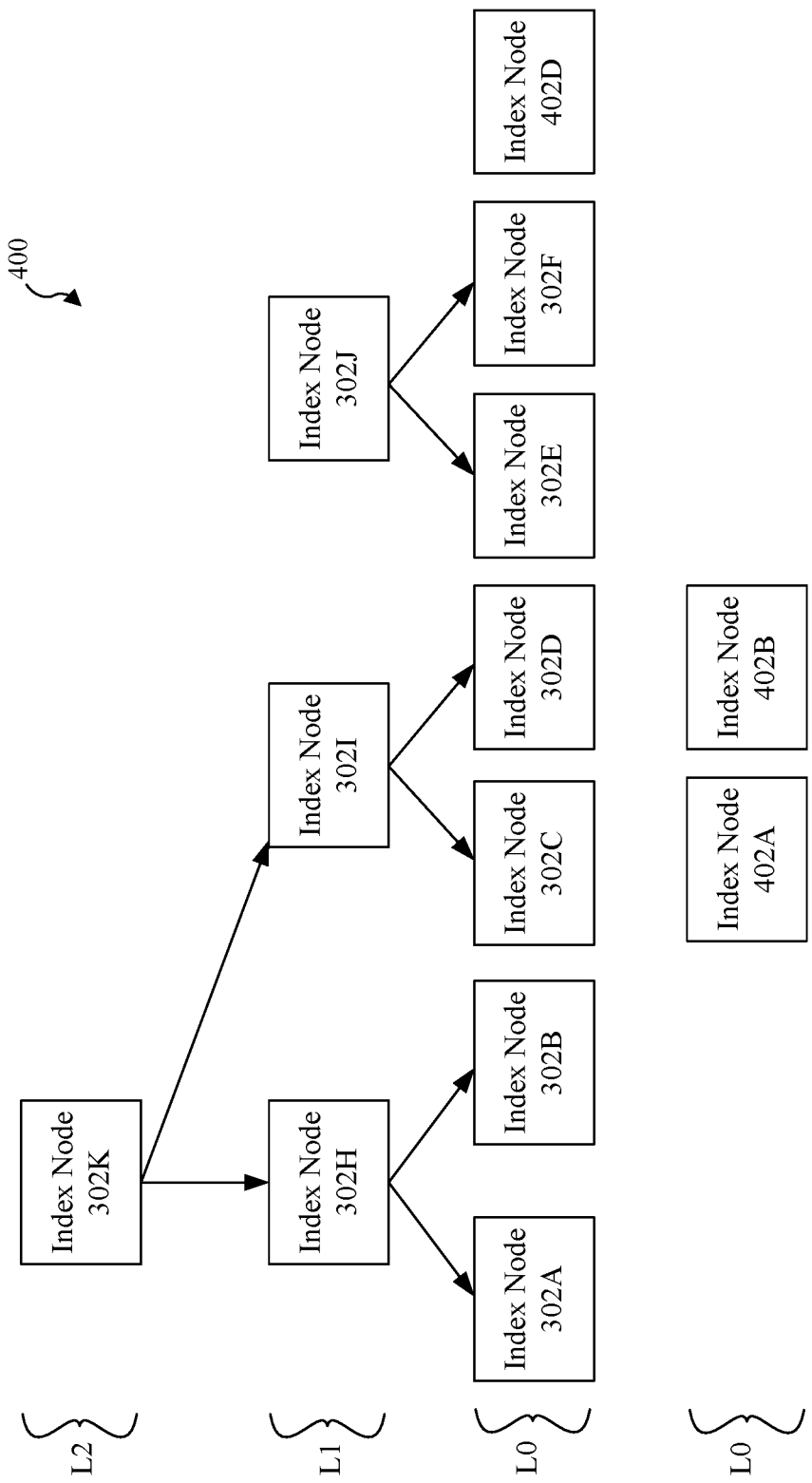

For example, as shown in FIG. 4B, index node 302G and index node 402C have been merged together to form index node 402D. Index node 402D comprises the search keys that were previously included in index nodes 302G and 402C, along with the location information paired with such search keys.

Figure 4C:
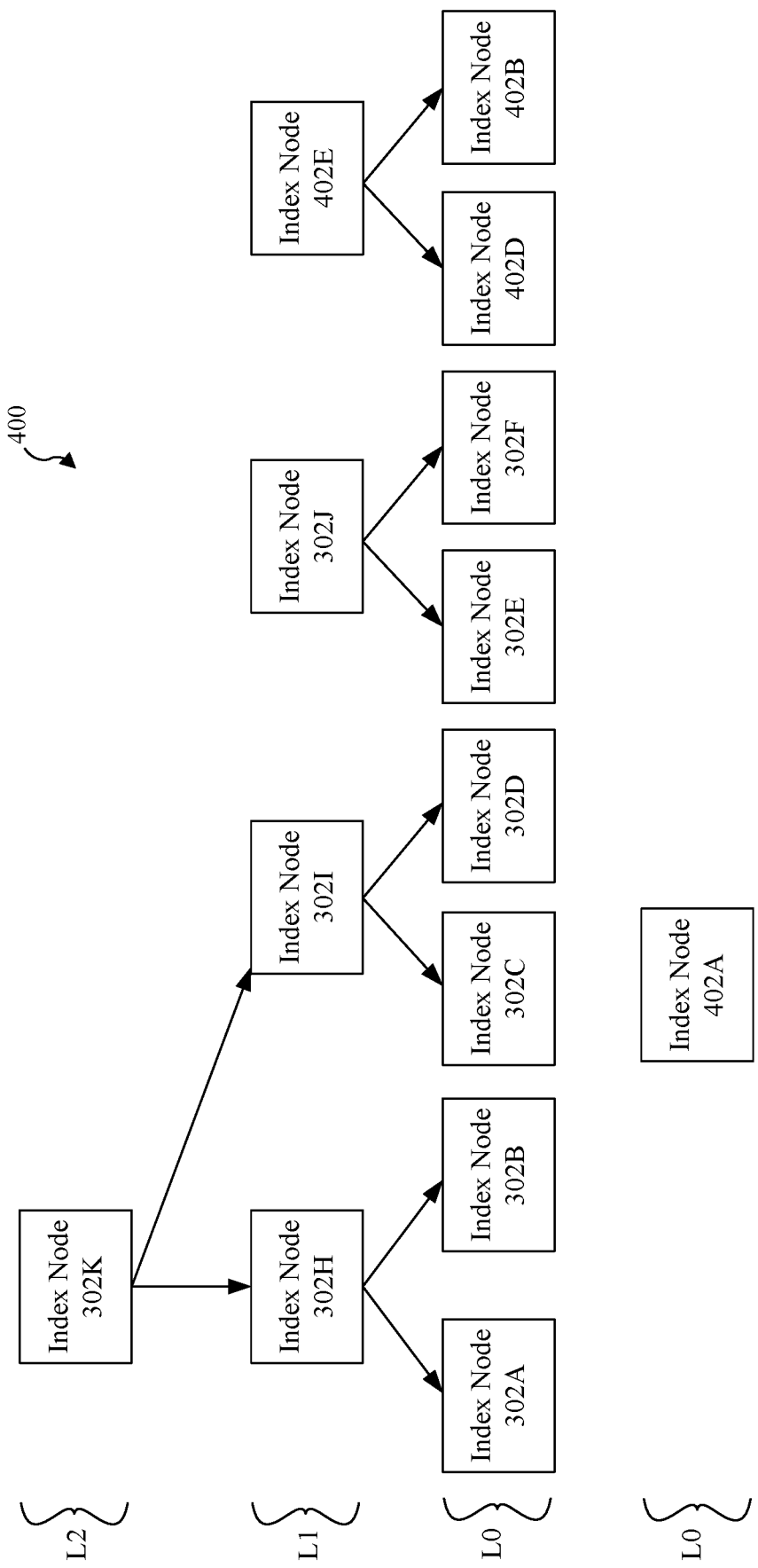

Higher-level nodes may also be added to hierarchical index structure 400 via an add operation in a similar manner as described above with reference to FIG. 2C. For example, with reference to FIG. 4B, suppose index nodes 402D and 402B comprise a number of duplicate search keys that exceed a predetermined threshold. A higher-level index node is generated that comprises the union of the search keys of index nodes 402D and 402B. For example, as shown in FIG. 4C, index node 402E has been generated at a higher level (i.e., Level L1) of hierarchical index structure 400 that comprises the search keys of index nodes 402D and 402B. Index node 402E points to each of index nodes 402D and 402B, rather than to the locations of the data blocks in which the search keys are located.

An issue that may arise via merge and add operations is that the resulting index node may contain many search keys (after the taking the union). In particular, this is a critical issue when the search keys are from a large domain consisting of billions (e.g., Job ID, Device ID, etc.) or trillions (e.g., Vertex ID, Task ID, etc.) of search keys. To avoid this phenomenon of cascading explosion, in accordance with an embodiment, instead of directly taking a union over the search keys, a hash function is first applied on the search keys, and the union is taken over the hashed values. Each level of hierarchical index structure 300 may use a different hash function, where the hash function used by a higher level further reduces the key space generated by the hash function used by the previous lower level. For example, as shown in FIGS. 3 and 4C, L1 may utilize a first hash function, and L2 may utilize a second hash function that is different than the first hash function. The first hash function effectively reduces the search keys to a number lower than the search keys represented by the index nodes of the lower level (e.g., L0). The second hash function effectively reduces the search keys even further.

It is noted that the number of levels and number of index nodes included in each level described above with reference to FIGS. 2-4C are purely exemplary and that a hierarchical index structure may comprise any number of levels, where each level may comprise any number of index nodes. It is further noted that that operations other than the add and merge operations may be utilized to construct a hierarchical index structure. For example, in accordance with an embodiment, a "split" operation may be utilized to split an index node into multiple index nodes, where the search keys in the node that is split are partitioned into the multiple index nodes using hash partitioning techniques. The split operation may be useful in situations where the key space is large and index nodes tend to contain many distinct keys. In such cases, the split operation may be applied to index nodes before performing a merge operation or add operation.

As demonstrated above, a hierarchical index structure is constructed in a bottom-up manner. This is different from building classic tree-based indexes, such as B-trees, where data is inserted into the index in a top-down manner. Periodic maintenance of the hierarchical index structure may also be performed, in which the hierarchical index structure is compacted in a bottom-up fashion. For instance, new leaf nodes may be constructed by merging any new index nodes and any old (already-generated) orphan index node that are below a predetermined size threshold. This may trigger adding more nodes at the next higher level, in which an add operation is performed starting from the old orphan index nodes. This procedure is recursive and more index nodes are added level by level until no more add or merge operations can be performed (e.g., due to the inapplicability of the size and/or commonality policies described above).

Figure 5:
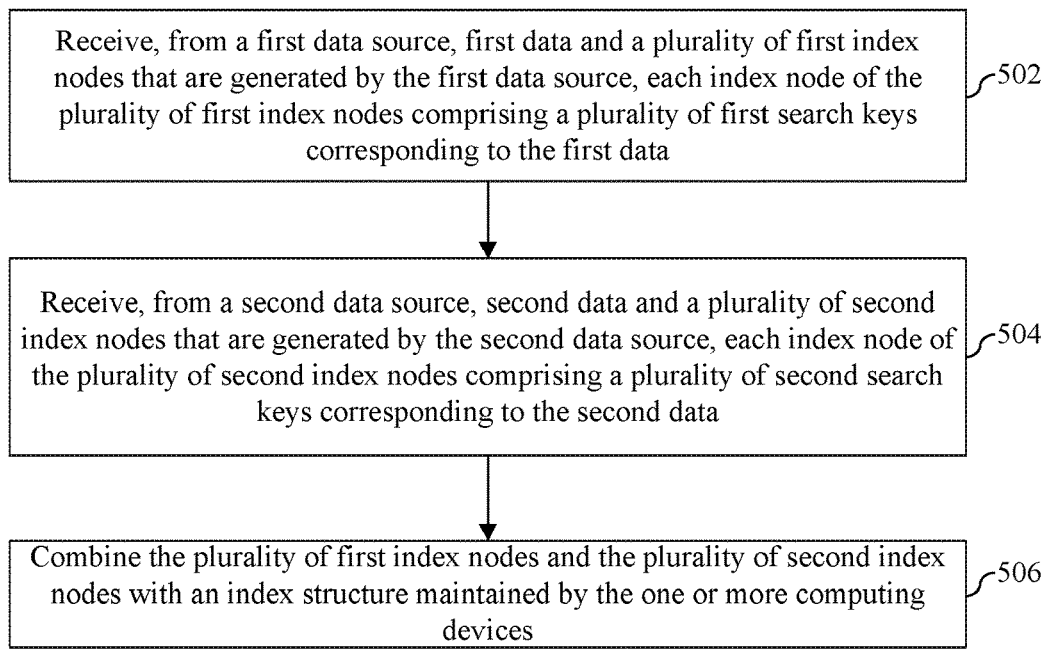
FIG. 5 shows a flowchart of a method for generating an index structure in accordance with an example embodiment.
Figure 6:
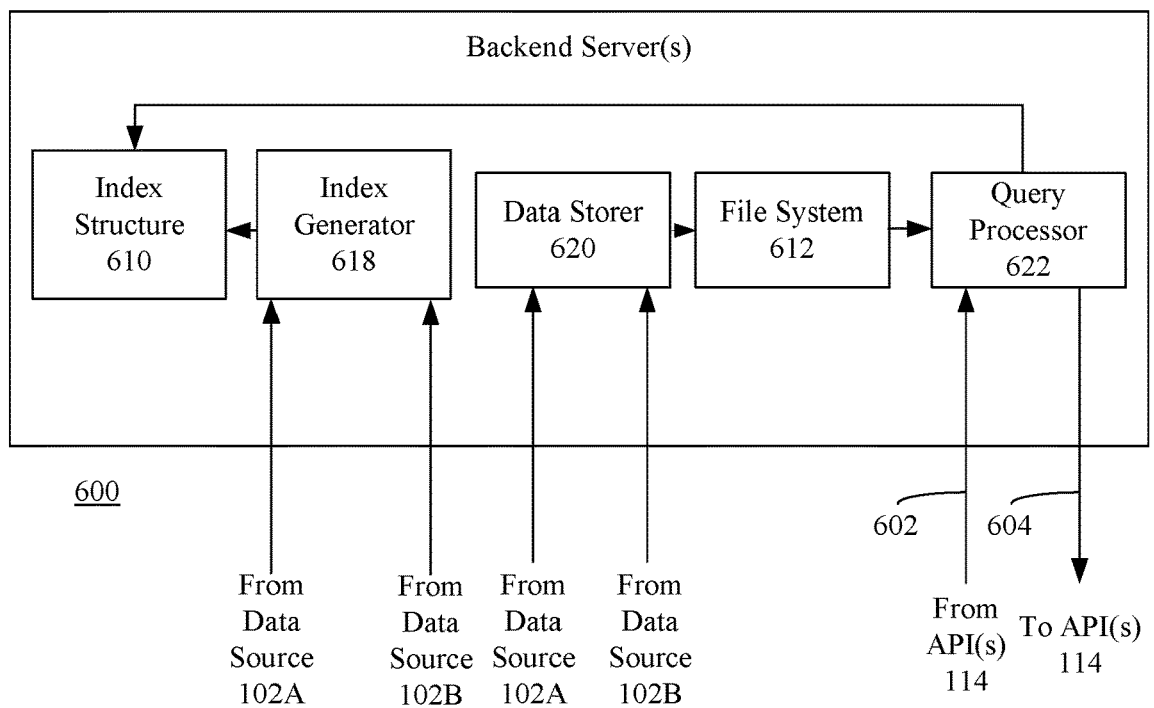
FIG. 6 is a block diagram of backend server(s) in accordance with an example embodiment.

Accordingly, an index structure for indexing search keys may be generated in many ways. For example, FIG. 5 shows a flowchart 500 of a method for generating an index structure, according to an example embodiment. In an embodiment, flowchart 500 may be implemented by computing device(s), such as backend server(s) 600, as shown in FIG. 6. FIG. 6 is a block diagram of backend server(s) 600, according to an example embodiment. Backend server(s) 600 are examples of backend server(s) 104, as described above with reference to FIG. 1. As shown in FIG. 6, backend server(s) 600 comprises index structure 610, index generator 618, file system 612, data storer 620 and query processor 622. Index structure 610, index generator 618, file system 612, data storer 620 and query processor 622 are examples of index structure 110, index generator 118, file system 112, data storer 120, and query processor 122, as described above with reference to FIG. 1. Additional components of backend server(s) 600 described above with reference to FIG. 1 (i.e., backend server(s) 104) are not described here for the sake of brevity. Other structural and operational embodiments will be apparent to persons skilled in the relevant art(s) based on the following discussion regarding flowchart 500 and backend server(s) 600 of FIG. 6.

Flowchart 500 of FIG. 5 begins with step 502. In step 502, first data and a plurality of first index nodes that are generated by a first data source are received from the first data source. Each index node of the plurality of first index nodes comprise a plurality of first search keys corresponding to the first data. For example, with reference to FIG. 5, data storer 620 receives first data from first data source 102A, and index generator 618 receives index nodes from a first data source 102A. Each index node of the plurality of first index nodes comprise a plurality of first search keys corresponding to the first data generated by first data source 102A. For instance, with reference to FIG. 4A, index node 402A may be received by index generator 618 from data source 102A. Data storer 620 stores the first data in file system 612.

In step 504, second data and a plurality of second index nodes that are generated by a second data source are received from the second data source. Each index node of the plurality of second index nodes comprise a plurality of second search keys corresponding to second data. For example, with reference to FIG. 5, data storer 620 receives second data from second data source 102B, and index generator 618 receives index nodes from a first data source 102B. Each index node of the plurality of second index nodes comprise a plurality of second search keys corresponding to the second data generated by second data source 102A. For instance, with reference to FIG. 4A, index nodes 402B-402C are received by index generator 618 from data source 102B. Data storer 620 stores the second data in file system 612.

In accordance with one or more embodiments, the first data generated by the first data source comprises first debug logs and the second data generated by the second data source comprises second debug logs.

In accordance with one or more embodiments, the plurality of first index nodes comprise first location information specifying a location at which each of the plurality of first search keys is stored in a file system maintained by the one or more computing devices, and the plurality of second index nodes comprise second location information specifying a location at which each of the plurality of second search keys is stored in the file system. For example, with reference to FIG. 6, the plurality of first index nodes comprise first location information specifying a location at which each of the plurality of first search keys is stored in file system 612 maintained by backend server(s) 800, and the plurality of second index nodes comprise second location information specifying a location at which each of the plurality of second search keys is stored in file system 612.

In accordance with one or more embodiments, the plurality of first index nodes and the plurality of second index nodes are received in a compressed format.

In accordance with one or more embodiments, the first data source serializes the first data and the second data source serializes the second data in accordance with one of a row-major format or a column-major format.

In accordance with one or more embodiments, the first data source encodes the first data and the second data source encodes the second data in accordance with an encoding format.

In accordance with one or more embodiments, the first data source filters the first data and the second data source filters the second data to remove particular data therefrom.

In accordance with one or more embodiments, the first data source formats the first data and the second data source formats the second data in accordance with at least one of a delimiter-separated value format, a JavaScript Object Notation format, or a binary format.

In accordance with one or more embodiments, the first data source is configured to constrain one or more first resources thereof that are utilized to perform at least one of compression of the first data, encoding of the first data, formatting of the first data, filtering of the first data, serialization of the first data, or generation of the plurality of first index nodes, and the second data source is configured to constrain one or more second resources thereof that are utilized to perform at least one of compression of the second data, encoding of the second data, formatting of the second data, filtering of the second data, serialization of the second data, or generation of the plurality of second index nodes.

In step 506, the plurality of first index nodes and the plurality of second index nodes are combined with an index structure maintained by the one or more computing devices. For example, with reference to FIG. 6, index generator 618 combines the plurality of first index nodes and the plurality of second index nodes with index structure 610.

In accordance with one or more embodiment, the received plurality of first index nodes and the received plurality of second index nodes are decompressed before combining the plurality of first index nodes and the received plurality of second index nodes with the index structure. For example, with reference to FIG. 6, index generator 618 decompresses the received plurality of first index nodes and the received plurality of second index node.

Figure 7:
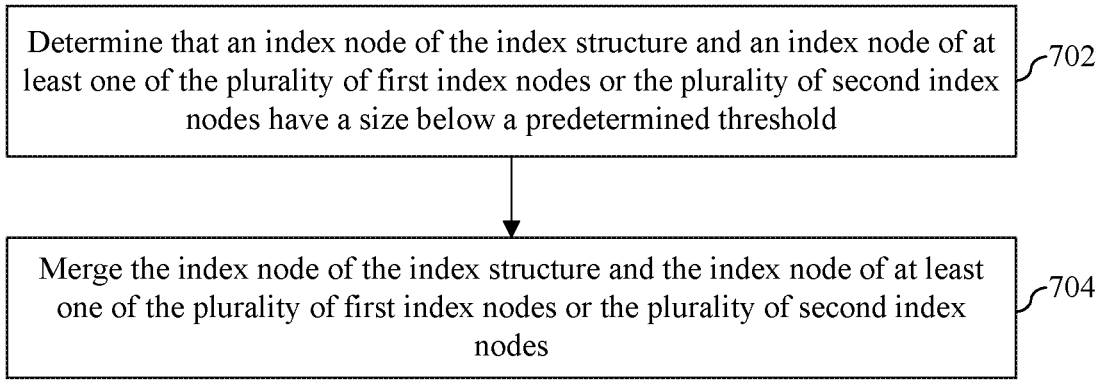
FIG. 7 shows a flowchart of a method for combining an index node with an index structure in accordance with an example embodiment.

In accordance with one or more embodiments, the plurality of first index nodes and the plurality of second index nodes are combined with the index structure based on a merge operation. For example, FIG. 7 shows a flowchart 700 of a method for combining an index node with an index structure, according to an example embodiment. In an embodiment, flowchart 700 may be implemented by backend server(s) 600, as shown in FIG. 6. Accordingly, flowchart 700 will be described with continued reference to FIG. 6. Other structural and operational embodiments will be apparent to persons skilled in the relevant art(s) based on the following discussion regarding flowchart 700 and backend server(s) 600 of FIG. 6.

Flowchart 700 of FIG. 7 begins with step 702. In step 702, a determination is made that an index node of the index structure and an index node of at least one of the plurality of first index nodes or the plurality of second index nodes have a size below a predetermined threshold. For example, with reference to FIG. 6, index generator 618 determines that an index node of index structure 610 and an index node of at least one of the plurality of first index nodes or the plurality of second index nodes has a size below a predetermined threshold. For instance, with reference to FIG. 4A, index generator 618 may determine that index node 302G and an index node received from one of data sources 102A-102N (e.g., index node 402C) have a size below a predetermined threshold (e.g., 64 MB).

In step 704, the index node of the index structure and the index node of at least one of the plurality of first index nodes or the plurality of second index nodes are merged. For example, with reference to FIG. 6, index generator 618 merges the index node of the index structure 610 and the index node of at least one of the plurality of first index nodes or the plurality of second index nodes. For instance, with reference to FIGS. 4A-4B, index generator 618 merges index node 302G and index node 402C to generate index node 402D.

Figure 8:
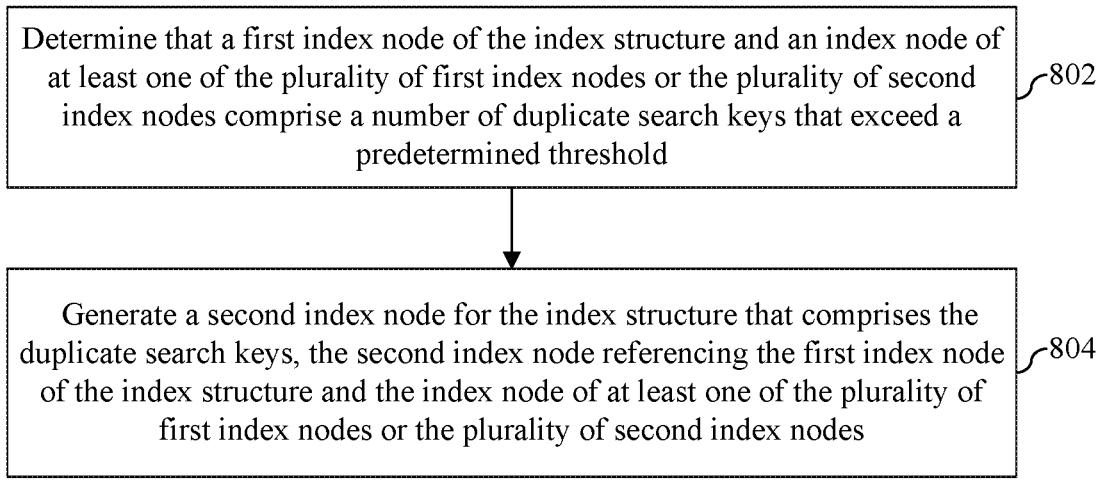
FIG. 8 shows a flowchart of a method for combining an index node with an index structure in accordance with another example embodiment.

In accordance with one or more embodiments, an index node of the index structure is merged with an index node received from at least one of the data sources based on a add operation. For example, FIG. 8 shows a flowchart 800 of a method for combining an index node with an index structure, according to another example embodiment. In an embodiment, flowchart 800 may be implemented by backend server(s) 600, as shown in FIG. 6. Accordingly, flowchart 800 will be described with continued reference to FIG. 6. Other structural and operational embodiments will be apparent to persons skilled in the relevant art(s) based on the following discussion regarding flowchart 800 and backend server(s) 600 of FIG. 6.

Flowchart 800 of FIG. 8 begins with step 802. In step 802, a determination is made that a first index node of the index structure and an index node of at least one of the plurality of first index nodes or the plurality of second index nodes comprise a number of duplicate search keys that exceed a predetermined threshold. For example, with reference to FIG. 6, index generator 618 determines that a first index node of index structure 610 and an index node of at least one of the plurality of first index nodes or the plurality of second index nodes comprise a number of duplicate search keys that exceed a predetermined threshold. For instance, with reference to FIG. 4B, index generator 618 may determine that index node 402D and an index node received from one of data sources 102A-102N (e.g., index node 402B) comprise a number of duplicate search keys that exceed a predetermined threshold In step 804, a second index node for the index structure that comprises the duplicate search keys is generated. The second index node references the first index node of the index structure and the index node of at least one of the plurality of first index nodes or the plurality of second index nodes. For example, with reference to FIG. 4C, index generator 618 generates index node 402E that comprises the duplicate search keys of index nodes 402D and 402B. As further shown in FIG. 4C, index node 402E references (e.g., points to) index nodes 402D and 402B.

Figure 9:
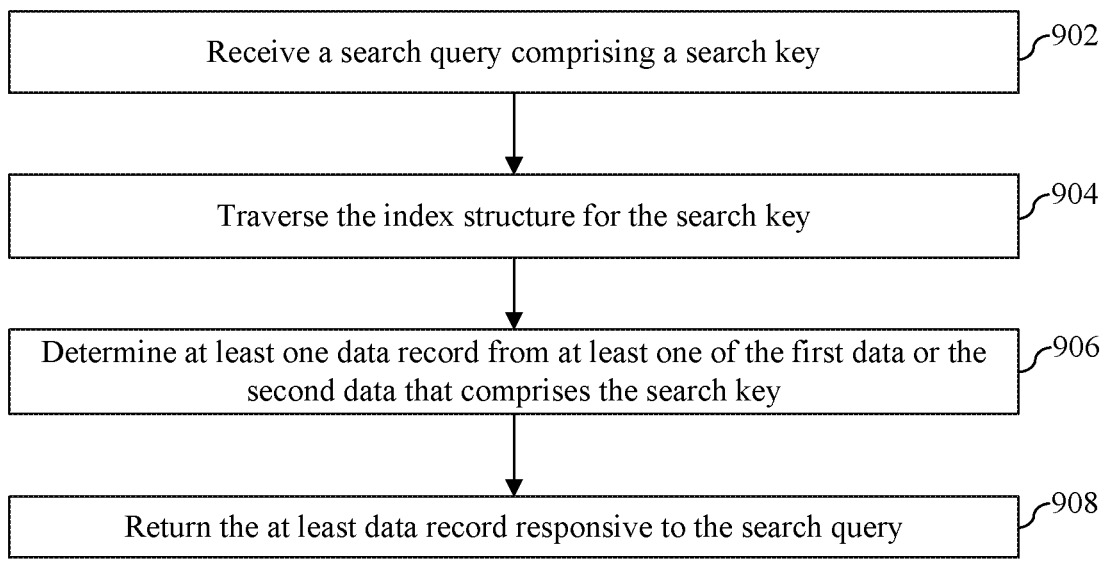
FIG. 9 shows a flowchart of a method for retrieving data records in accordance with an example embodiment.

In accordance with one or more embodiments, a user may issue a query (e.g., via user interface 128) for data records (e.g., debug logs) generated by data sources 102A-102N based on one or more search keys included in the search query. For example, FIG. 9 shows a flowchart 900 of a method for retrieving data records, according to an example embodiment. In an embodiment, flowchart 900 may be implemented by backend server(s) 600, as shown in FIG. 6. Accordingly, flowchart 900 will be described with continued reference to FIG. 6. Other structural and operational embodiments will be apparent to persons skilled in the relevant art(s) based on the following discussion regarding flowchart 900 and backend server(s) 600 of FIG. 6.

Flowchart 900 of FIG. 9 begins with step 902. In step 902, a search query is received comprising a search key. For example, with reference to FIG. 6, query processor 622 receives a search query 602 (e.g., via APIs 114, as described above with reference to FIG. 1.). In accordance with an embodiment, search query 602 may be initiated by the user (e.g., via user interface 128) responsive to a determination that an issue was detected with respect to data sources 102A-102N. For instance, the user may receive an indication via user interface 128 that a software and/or hardware issue has been detected with respect to data sources 102A-102N (e.g., a computing process executing on one or more data sources 102-102N is not operating correctly, computing resource(s) (e.g., power, memory, processing, network bandwidth, etc.) are being misallocated or mismanaged, one or more of data sources 102A-102N has powered down and/or restarted, etc.).

In step 904, the index structure is traversed for the search key. For instance, with reference to FIG. 6, query processor 622 traverses index structure 610 for the search key. Exemplary index structure traversal techniques are described below in Subsection B.

In step 906, at least one data record from at least one of the first data or the second data that comprises the search key is determined. For example, with reference to FIG. 6, query processor 622 locates index nodes comprising the search keys and determines the location information paired therewith to determine the at least one data record. For instance, the location information may specify a location in which the data record comprising the search key is stored in file system 612.

In step 908, the at least one data record is returned responsive to the search query. For example, with reference to FIG. 6, query processor 622 retrieves the data record from file system 612 based on the location information and returns the data record via a query response 604. Query response 604 is provided to API(s) 114. User interface engine 116 causes the data record to be rendered via user interface 128.

B. Hierarchical Index Structure Traversal for Search Key Retrieval

As described above, index structure 610 is traversed for search keys responsive to receiving search queries, for example, via client computing device 118. In an embodiment in which index structure 610 is a hierarchical index structure, the traversal of hierarchical index structure 110 does not follow a strict "move down" protocol, where the structure is traversed downward from a single root node (as is performed in classic tree-based indexes) due to the existence of orphan index nodes, as described above with reference to FIG. 3. Thus, a different traversal technique is utilized for such index structures.

Figure 10:
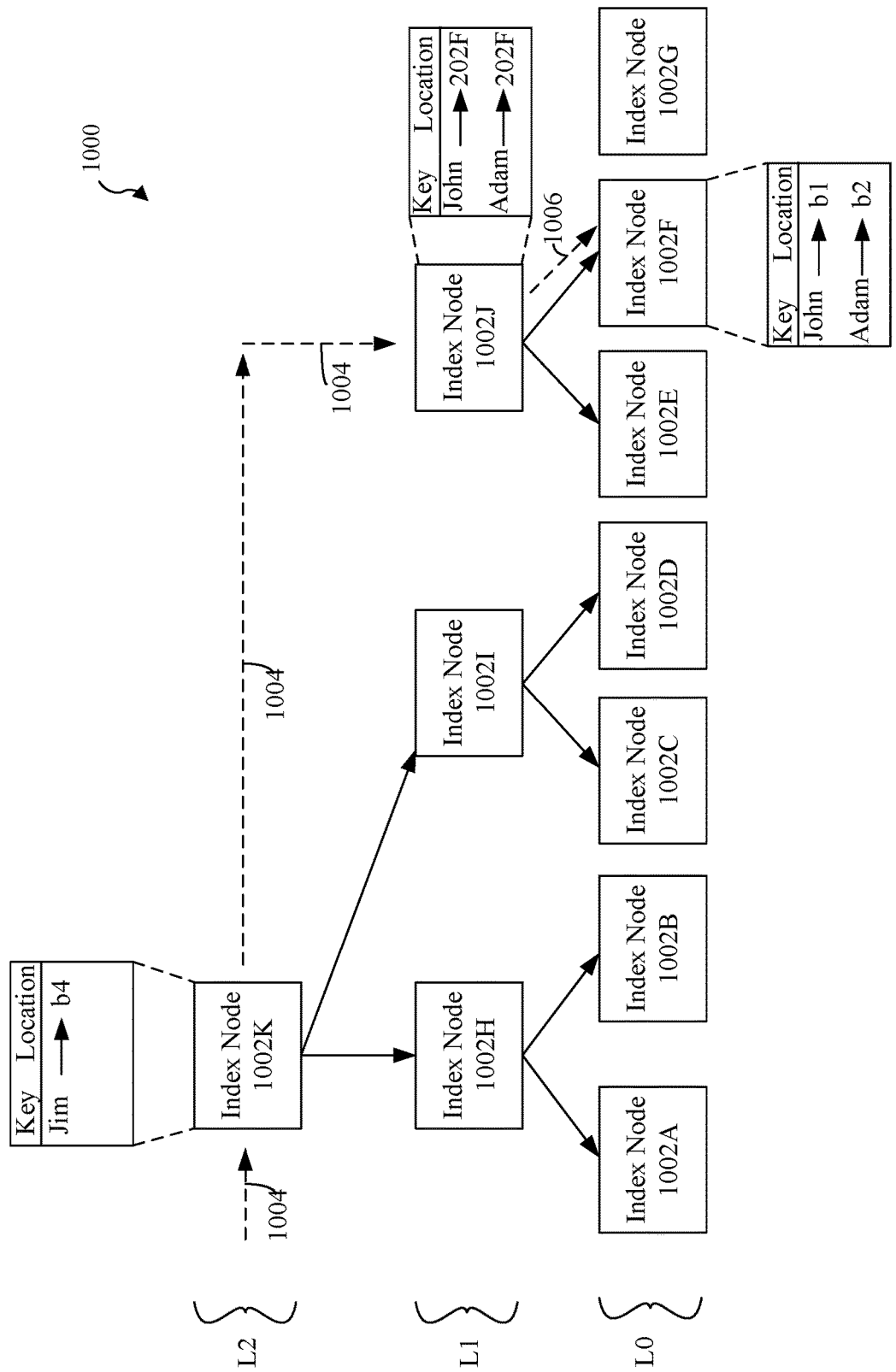
FIG. 10 depicts a hierarchical index structure in accordance with another example embodiment.

The hierarchical index structure traversal technique will be now be described with reference to FIG. 10. FIG. 10 depicts a hierarchical index structure 1000 in accordance with an example embodiment. Hierarchical index structure 1000 comprises a plurality of levels (L0-L2). As shown in FIG. 10, hierarchical index structure 1000 comprises a first level (L0) comprising index nodes 1002A-1002G, a second level (L1) comprising index nodes 1002H-1002J, and a third level (L2) comprising index node 1002K.

When traversing hierarchical index structure 1000, orphan index nodes (index nodes 1002K, 1002J, and 1002G) are scanned level by level in a top-down manner. When scanning each index level, each orphan node at a particular level is searched for the search key(s) (or hashed version thereof) specified by the received query. For instance, with reference to FIG. 10, suppose a query specifies search key "John". In the example shown in FIG. 10, index node 1002F comprises search key "John". To locate the search key, the index node located at the highest level (i.e. L2) is scanned first for the search key. For instance, with reference to FIG. 10, index node 1002K is first scanned to determine whether index node 1002K comprises the search key. Because index node 1002K does not include the search key, the next orphan index node is scanned. The next orphan index node may be located at the same level or at lower level. In the example shown in FIG. 10, no other orphan index nodes exist at the highest level (i.e., L2). As such, the next level of hierarchical index structure 1000 is searched for an orphan node. In the example shown in FIG. 10, level L1 includes orphan index node 1002J. Accordingly, orphan index node 1002J is scanned for the search key. In this example, search key "Jim" is found in orphan index node 1002J. The orphan index node search described above is represented as dashed lines 1004, where index node 1002K is search first, followed by index node 1002J. This type of search may be referred to as a "move right" operation, as the search moves rightward to the next orphan index node.

Once an orphan index node comprising the search key is found, the location information for that search key is determined. If the orphan index node is not a leaf index node, then the location information of the orphan index node references (i.e., points to) an index node located at a lower level of hierarchical index structure 1000 that includes the search key. If the orphan index node is a leaf index node, then the location information specifies the location of the data block that contains the search key. In the example shown in FIG. 10, the location information associated with search key "John" specifies that index node 1002F includes the search key. Accordingly, index node 1002F is searched for the search key. As the search moves downward to the child index nodes of index node 1002J (represented as dashed line 1006), such a search operation is referred to as a "move down" operation.

After finding the search key in index node 1002F, the location information associated therewith is determined. In the example shown in FIG. 10, the location information specifies the location of the data block that includes the search key, as index node 1002F is a leaf index node. Responsive to determining the data block, one or more data records comprising the search key that are located at the corresponding data block is retrieved and returned to the user issuing the query.

It is noted that multiple orphan nodes may comprise the same search key. Accordingly, when traversing hierarchical index structure 1000, each orphan index node may be scanned at each level of hierarchical index structure 1000. Upon determination that a particular orphan index node comprises the search key, the search function executes the "move down" operation by recursively inquiring the child nodes pointed by the current index node being searched if the search key has been found within the current node.

As described above, users may issue hybrid queries in which both index nodes and data blocks that have not yet been indexed may be searched. This advantageously returns search keys representative of the latest view of the data received by backend server(s) 104. In contrast, when issuing standard queries, in which only index nodes are searched, search keys may be returned that are representative of a possibly stale version of the data.

Referring again to FIG. 1, to execute a hybrid query, query processor 122 queries progress log 124 to identify the data blocks that have been stored in file system 112, but have not yet been indexed. Query processor 122 traverses hierarchical index structure 110 to locate the search key specified by the hybrid query in the index nodes included therein and also searches the data blocks that have not yet been indexed, as identified via progress log 124. For instance, query processor 122 may perform a linear scan of each identified data block for the search key. The search keys found via traversal of hierarchical index structure 110 and found via linearly scanning the identified data blocks are provided to the user via a query response.

Figure 11:
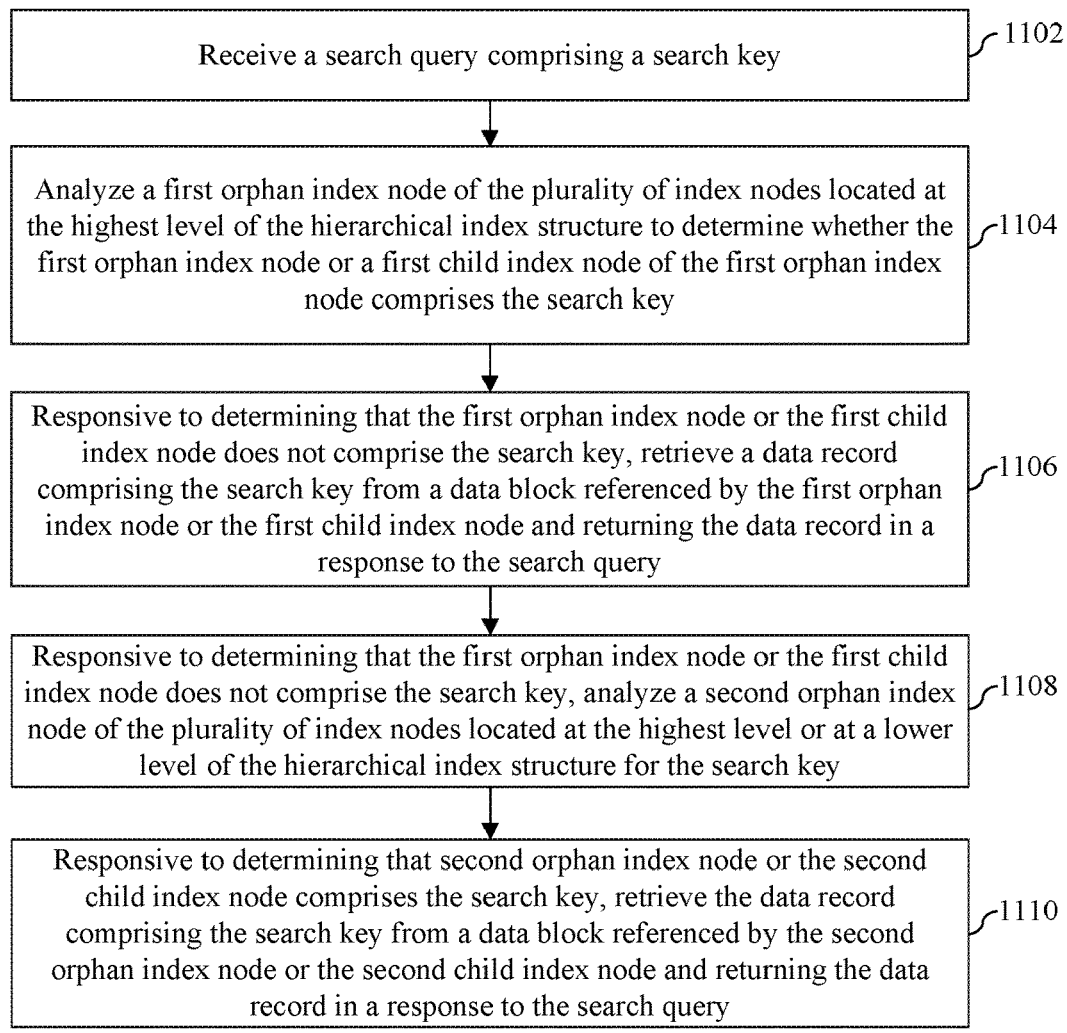
FIG. 11 shows a flowchart of a method for traversing a hierarchical index structure to locate search keys in accordance with an example embodiment.
Figure 12:
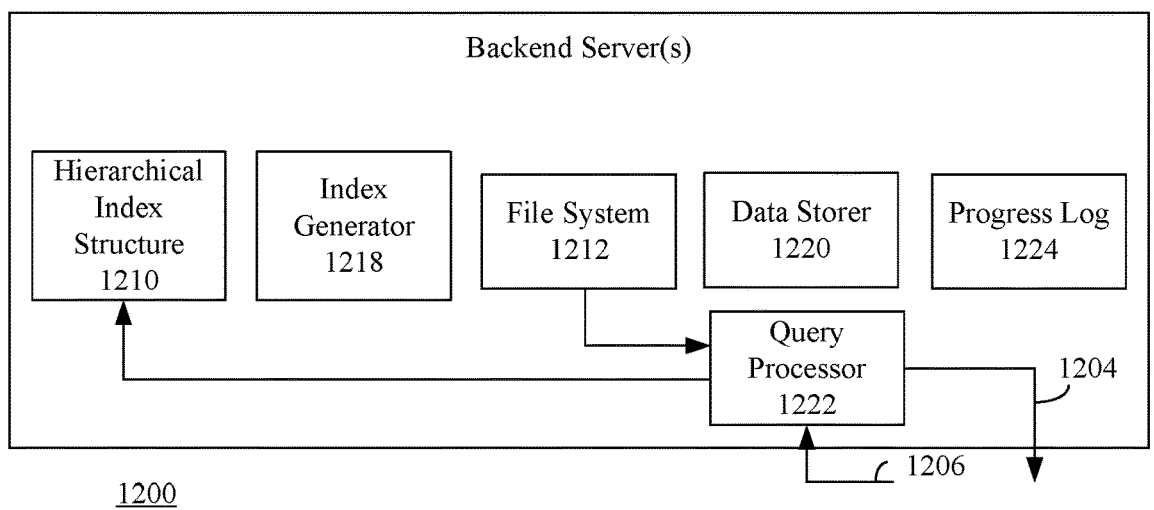
FIG. 12 is a block diagram of backend server(s) in accordance with another example embodiment.

Accordingly, search keys may be located via a hierarchical index structure in various ways. For example, FIG. 11 shows a flowchart 1100 of a method for traversing a hierarchical index structure to locate search keys, according to an example embodiment. In an embodiment, flowchart 1100 may be implemented by backend server(s) 1200, as shown in FIG. 12. FIG. 12 is a block diagram of backend server(s) 1200, according to an example embodiment. Backend server(s) 1200 are examples of backend server(s) 104 and backend server(s) 600, as respectively described above with reference to FIGS. 1 and 6. As shown in FIG. 12, backend server(s) 1200 comprises hierarchical index structure 1210, index generator 1218, file system 1212, data storer 1220, progress log 1224, and query processor 1222. Hierarchical index structure 1210, index generator 1218, file system 1212, data storer 1220, progress log 1224, and query processor 1222 are examples of index structure 110, index generator 118, file system 112, data storer 120, progress log 124, query processor 122, as described above with reference to FIG. 1, and examples of index structure 610, index generator 618, file system 612, and query processor 622, respectively, as described above with reference to FIG. 6. Other structural and operational embodiments will be apparent to persons skilled in the relevant art(s) based on the following discussion regarding flowchart 1100 and backend server(s) 1200 of FIG. 12.

Flowchart 1100 of FIG. 11 begins with step 1102. In step 1102, a search query comprising a search key is received.

For example, with reference to FIG. 12, query processor receives a search query 1202, for example, via API(s) 114, as described above with reference to FIG. 1. Responsive to receiving the search query, a hierarchical index structure comprising a plurality of index nodes is traversed for the search. Steps 1104, 1106, 1108, and 1110 describe the traversal process in accordance with an example embodiment.

In step 1104, a first orphan index node of the plurality of index nodes located at the highest level of the hierarchical index structure is analyzed to determine whether the first orphan index node or a first child index node of the first orphan index node comprises the search key. For example, with reference to FIG. 12, query processor 1222 traverses hierarchical index structure 1210 to locate and analyze a first orphan index node of the plurality of index nodes located at the highest level of hierarchical index structure 1210 to determine whether the first orphan index node or a first child index node of the first orphan index node comprises the search key. For instance, with reference to FIG. 10, query processor 1222 locates and analyzes index node 1002K, as it is the orphan index node located at the highest level (L2) of hierarchical index structure 1000. Query processor 1222 analyzes 1002K to determine whether index node 1002K comprises the search key or whether index node 1002K references a child node thereof (e.g., index nodes 1002H or 1002I) that comprises the search key.

In step 1106, responsive to determining that first orphan index node or the first child index node comprises the search key, a data record comprising the search key is retrieved from a data block referenced by the first orphan index node or the first child index node. The data record is returned in a response to the search query. For example, with reference to FIG. 12, responsive to determining that first orphan index node or the first child index node comprises the search key, query processor 1222 retrieves a data record comprising the search key from a data block referenced by the first orphan index node or the first child index node. The data block is stored in file system 1212. Query processor 1222 returns the data record in a query response 1204. Query response 1204 is provided to API(s) 114. User interface engine 116 causes the data record to be rendered via user interface 128.

In accordance with one or more embodiments, the data block is referenced by the first orphan index node or the first child index node via location information maintained by the first orphan index node or the first child index node. With reference to FIG. 10, if index node 1002K comprises the search key, query processor 1022 recursively searches through all its child index nodes until it locates the child node that comprises location information specifying the location of the data block that comprises the search key.

In accordance with one or more embodiments, the location information comprises a uniform resource identifier identifying at least one of a path to a file or an offset thereof in which the data block is stored.

In step 1108, responsive to determining that the first orphan index node or the first child index node does not comprise the search key, a second orphan index node of the plurality of index nodes located at the highest level or at a lower level of the hierarchical index structure is analyzed for the search key. For example, with reference to FIG. 12, responsive to determining that the first orphan index node or the first child index node does not comprise the search key, query processor 1222 locates and analyzes a second orphan index node of the plurality of index nodes located at the highest level or at a lower level of hierarchical index structure 1210. For example, with reference to FIG. 10, if orphan index node 1006K does not include the search key, query processor 1222 locates another orphan index node at level L2. If none exist, as is the case in FIG. 10, query processor 1222 searches for an orphan index node at the next highest level (i.e., L1). In the example shown in FIG. 10, index node 1002J is next orphan index node that is analyzed for the search key.

In accordance with one or more embodiments, the first orphan index node and the second orphan index node are parentless. For example, with reference to FIG. 10, orphan index nodes 1002K, 1002J and 1002G do not have any parent nodes that reference them, and therefore, are parentless.

In step 1110, responsive to determining that second orphan index node or the second child index node comprises the search key, the data record comprising the search key is retrieved from a data block referenced by the second orphan index node or the second child index node and the data record is returned in a response to the search query. For example, with reference to FIG. 12, responsive to determining that second orphan index node or the second child index node comprises the search key, query processor 1222 retrieves the data record comprising the search key from a data block referenced by the second orphan index node or the second child index node. The data block is stored in file system 1212. The data record is returned in query response 1204. With reference to FIG. 10, if index node 1002J comprises the search key, query processor 1222 recursively searches through all its child index nodes (i.e., index nodes 1002E and 1002F) until it locates the child node that comprises location information specifying the location of the data block that comprises the search key. If index node 1002J does not comprise the search key, query processor 1222 locates another orphan index node at level L1. If none exist, as is the case in FIG. 10, query processor 1222 searches for an orphan index node at the next highest level (i.e., L0). In the example shown in FIG. 10, index node 1002G would be the next orphan index node (located at L0) that is analyzed for the search key.

In accordance with one or more embodiments, a progress log is maintained that stores a first indication of each of the plurality of index nodes that have been generated for the hierarchical index structure. For example, with reference to FIG. 12, backend server(s) 1200 maintain progress log 1224 that stores a first indication of each of the plurality of index nodes (e.g., index nodes 1002A-1002K, as shown in FIG. 10) that have been generated for hierarchical index structure 1000. Additional details regarding how progress log 1024 is populated with such information is described above with reference to FIG. 1.

In accordance with one or more embodiments, the progress log further comprises a second indication of data blocks that have been stored in a file system but for which an index node has not yet been generated for the hierarchical index structure. For example, with reference to FIG. 12, progress log 1224 further comprises a second indication of data blocks that have been stored in file system 1212 but for which an index node has not yet been generated for hierarchical index structure 1210. Additional details regarding how progress log 1224 is populated with such information is described above with reference to FIG. 1.

In accordance with one or more embodiments, a hybrid query is executed such that both the index nodes of the hierarchical index structure and the data blocks that have not yet been indexed are searched for the search key. For example, a determination is made that at least one data block of the data blocks comprises the search key. The search key is retrieved from the at least one data block. The search key retrieved from the at least second data block is returned in the response to the search query. For example, with reference to FIG. 12, search query 1202 may be a hybrid query that indicates that both the index nodes of hierarchical index structure 1210 and the data blocks that have not yet been indexed (as indicated by progress log 1224 and stored in file system 1212) are to be searched for the search key. In such a case, query processor 1222 searches through such data blocks for the search key. If the search key is found, the data record comprising the search key is returned in query response 1204.

In accordance with one or more embodiments, a linear scan operation is performed on the data blocks to determine that at least one data block of the data blocks comprises the search key. For example, with reference to FIG. 12, query processor 1222 performs a linear scan operation on the data blocks stored by file system 1212 that have not yet been indexed to determine whether such data blocks comprise the search key.

III. Example Computer System Implementation

Client computing device 108, user interface 128, frontend server(s) 106, API(s) 114, user interface engine 116, backend server(s) 104, index structure 110, index generator 118 file system 112, data storer 120, query processor 122, data sources 102A-102N, agent 126, parser and formatter 128, filter and scrubber 130, indexer 132, encoder and compressor 124, serializer 136, resource manager 138, hierarchical index structure 200, hierarchical index structure 300, hierarchical index structure 400, backend server(s) 600, index structure 610, index generator 618, file system 612, data storer 620, query processor 622, hierarchical index structure 1000, backend server(s) 1200, hierarchical index structure 1210, index generator 1218, file system 1212, data storer 1220, and/or query processor 1222 (and/or any of the components described therein), and/or flowcharts 500, 700, 800, 900 and/or 1100, may be implemented in hardware, or hardware combined with one or both of software and/or firmware. For example, client computing device 108, user interface 128, frontend server(s) 106, API(s) 114, user interface engine 116, backend server(s) 104, index structure 110, index generator 118 file system 112, data storer 120, query processor 122, data sources 102A-102N, agent 126, parser and formatter 128, filter and scrubber 130, indexer 132, encoder and compressor 124, serializer 136, resource manager 138, hierarchical index structure 200, hierarchical index structure 300, hierarchical index structure 400, backend server(s) 600, index structure 610, index generator 618, file system 612, data storer 620, query processor 622, hierarchical index structure 1000, backend server(s) 1200, hierarchical index structure 1210, index generator 1218, file system 1212, data storer 1220, and/or query processor 1222 (and/or any of the components described therein), and/or flowcharts 500, 700, 800, 900 and/or 1100 may be implemented as computer program code/instructions configured to be executed in one or more processors and stored in a computer readable storage medium.

Alternatively, client computing device 108, user interface 128, frontend server(s) 106, API(s) 114, user interface engine 116, backend server(s) 104, index structure 110, index generator 118 file system 112, data storer 120, query processor 122, data sources 102A-102N, agent 126, parser and formatter 128, filter and scrubber 130, indexer 132, encoder and compressor 124, serializer 136, resource manager 138, hierarchical index structure 200, hierarchical index structure 300, hierarchical index structure 400, backend server(s) 600, index structure 610, index generator 618, file system 612, data storer 620, query processor 622, hierarchical index structure 1000, backend server(s) 1200, hierarchical index structure 1210, index generator 1218, file system 1212, data storer 1220, and/or query processor 1222 (and/or any of the components described therein), and/or flowcharts 500, 700, 800, 900 and/or 1100 may be implemented as hardware logic/electrical circuitry.

For instance, in an embodiment, one or more, in any combination, of client computing device 108, user interface 128, frontend server(s) 106, API(s) 114, user interface engine 116, backend server(s) 104, index structure 110, index generator 118 file system 112, data storer 120, query processor 122, data sources 102A-102N, agent 126, parser and formatter 128, filter and scrubber 130, indexer 132, encoder and compressor 124, serializer 136, resource manager 138, hierarchical index structure 200, hierarchical index structure 300, hierarchical index structure 400, backend server(s) 600, index structure 610, index generator 618, file system 612, data storer 620, query processor 622, hierarchical index structure 1000, backend server(s) 1200, hierarchical index structure 1210, index generator 1218, file system 1212, data storer 1220, and/or query processor 1222 (and/or any of the components described therein), and/or flowcharts 500, 700, 800, 900 and/or 1100 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 13:
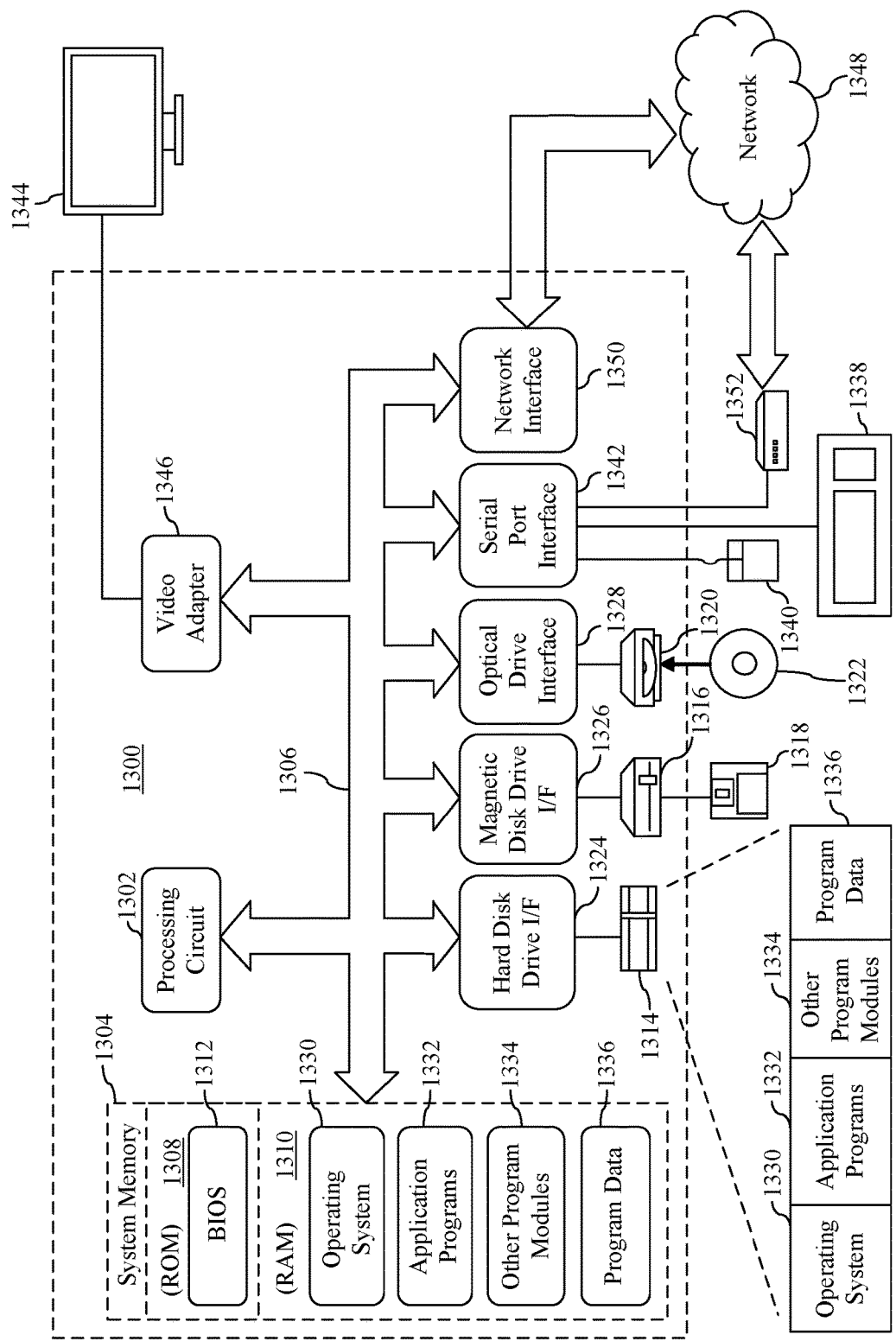
FIG. 13 is a block diagram of an example processor-based computer system that may be used to implement various embodiments.

FIG. 13 depicts an exemplary implementation of a computing device 1300 in which embodiments may be implemented. For example, client computing device 108, user interface 128, frontend server(s) 106, API(s) 114, user interface engine 116, backend server(s) 104, index structure 110, index generator 118 file system 112, data storer 120, query processor 122, data sources 102A-102N, agent 126, parser and formatter 128, filter and scrubber 130, indexer 132, encoder and compressor 124, serializer 136, resource manager 138, hierarchical index structure 200, hierarchical index structure 300, hierarchical index structure 400, backend server(s) 600, index structure 610, index generator 618, file system 612, data storer 620, query processor 622, hierarchical index structure 1000, backend server(s) 1200, hierarchical index structure 1210, index generator 1218, file system 1212, data storer 1220, and/or query processor 1222 (and/or any of the components described therein), and/or flowcharts 500, 700, 800, 900 and/or 1100 may be implemented in one or more computing devices similar to computing device 1300 in stationary or mobile computer embodiments, including one or more features of computing device 1300 and/or alternative features. The description of computing device 1300 provided herein is provided for purposes of illustration, and is not intended to be limiting. Embodiments may be implemented in further types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random-access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing any of the features of client computing device 108, user interface 128, frontend server(s) 106, API(s) 114, user interface engine 116, backend server(s) 104, index structure 110, index generator 118 file system 112, data storer 120, query processor 122, data sources 102A-102N, agent 126, parser and formatter 128, filter and scrubber 130, indexer 132, encoder and compressor 124, serializer 136, resource manager 138, hierarchical index structure 200, hierarchical index structure 300, hierarchical index structure 400, backend server(s) 600, index structure 610, index generator 618, file system 612, data storer 620, query processor 622, hierarchical index structure 1000, backend server(s) 1200, hierarchical index structure 1210, index generator 1218, file system 1212, data storer 1220, and/or query processor 1222 (and/or any of the components described therein), and/or flowcharts 500, 700, 800, 900 and/or 1100, and/or further embodiments described herein.

A user may enter commands and information into computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of the computing device 1300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

III. Additional Exemplary Embodiments

A method implemented by one or more computing devices is described herein. The method includes: receiving, from a first data source, first data and a plurality of first index nodes that are generated by the first data source, each index node of the plurality of first index nodes comprising a plurality of first search keys corresponding to the first data; receiving, from a second data source, second data and a plurality of second index nodes that are generated by the second data source, each index node of the plurality of second index nodes comprising a plurality of second search keys corresponding to the second data; and combining the plurality of first index nodes and the plurality of second index nodes with an index structure maintained by the one or more computing devices.

In one embodiment of the foregoing method, the plurality of first index nodes and the plurality of second index nodes are received in a compressed format.

In another embodiment of the foregoing method, the method further comprises decompressing the received plurality of first index nodes and the received plurality of second index nodes before said combining.

In a further embodiment of the foregoing method, the first data source encodes the first data and the second data source encodes the second data in accordance with an encoding format.

In another embodiment of the foregoing method, the first data source serializes the first data and the second data source serializes the second data in accordance with one of a row-major format or a column-major format.

In a further embodiment of the foregoing method, the first data source filters the first data and the second data source filters the second data to remove particular data therefrom.

In another embodiment of the foregoing method, the first data source formats the first data and the second data source formats the second data in accordance with at least one of a delimiter-separated value format, a JavaScript Object Notation format, or a binary format.

In a further embodiment of the foregoing method, the first data source is configured to constrain one or more first resources thereof that are utilized to perform at least one of compression of the first data, encoding of the first data, formatting of the first data, filtering of the first data, serialization of the first data, or generation of the plurality of first index nodes, and the second data source is configured to constrain one or more second resources thereof that are utilized to perform at least one of compression of the second data, encoding of the second data, formatting of the second data, filtering of the second data, serialization of the second data, or generation of the plurality of second index nodes.

In another embodiment of the foregoing method, said combining comprises: determining that an index node of the index structure and an index node of at least one of the plurality of first index nodes or the plurality of second index nodes have a size below a predetermined threshold; and merging the index node of the index structure and the index node of at least one of the plurality of first index nodes or the plurality of second index nodes.

In yet another embodiment of the foregoing method, said combining comprises: determining that a first index node of the index structure and an index node of at least one of the plurality of first index nodes or the plurality of second index nodes comprise a number of duplicate search keys that exceed a predetermined threshold; and generating a second index node for the index structure that comprises the duplicate search keys, the second index node referencing the first index node of the index structure and the index node of at least one of the plurality of first index nodes or the plurality of second index nodes.

In a further embodiment of the foregoing method, the plurality of first index nodes comprise first location information specifying a location at which each of the plurality of first search keys is stored in a file system maintained by the one or more computing devices, and the plurality of second index nodes comprise second location information specifying a location at which each of the plurality of second search keys is stored in the file system.

In yet another embodiment of the foregoing method, the first data generated by the first data source comprises first debug logs and the second data generated by the second data source comprises second debug logs.

In a further embodiment of the foregoing method, the method further comprises: receiving a search query comprising a search key; traversing the index structure for the search key; determining at least one data record from at least one of the first data or the second data that comprises the search key; and returning the at least one data record responsive to the search query.

A system is described herein. The system includes: at least one processor circuit; and at least one memory that stores program code configured to be executed by the at least one processor circuit, the program code comprising: an index generator configured to: receive, from a first data source, first data and a plurality of first index nodes that are generated by the first data source, each index node of the plurality of first index nodes comprising a plurality of first search keys corresponding to the first data; receive, from a second data source, second data and a plurality of second index nodes that are generated by the second data source, each index node of the plurality of second index nodes comprising a plurality of second search keys corresponding to the second data; and combine the plurality of first index nodes and the plurality of second index nodes with an index structure maintained by the system.

In one embodiment of the foregoing system, the plurality of first index nodes and the plurality of second index nodes are received in a compressed format.

In another embodiment of the foregoing system, the index generator is further configured to: decompress the received plurality of first index nodes and the received plurality of second index nodes before said combining.

In a further embodiment of the foregoing system, the index generator is configured to combine the plurality of first index nodes and the plurality of second index nodes with an index structure maintained by the system by: determining that an index node of the index structure and an index node of at least one of the plurality of first index nodes or the plurality of second index nodes have a size below a predetermined threshold; and merging the index node of the index structure and the index node of at least one of the plurality of first index nodes or the plurality of second index nodes.

In yet another embodiment of the foregoing system, the index generator is configured to combine the plurality of first index nodes and the plurality of second index nodes with an index structure maintained by the system by: determining that a first index node of the index structure and an index node of at least one of the plurality of first index nodes or the plurality of second index nodes comprise a number of duplicate search keys that exceed a predetermined threshold; and generating a second index node for the index structure that comprises the duplicate search keys, the second index node referencing the first index node of the index structure and the index node of at least one of the plurality of first index nodes or the plurality of second index nodes.

In a further embodiment of the foregoing system, the plurality of first index nodes comprise first location information specifying a location at which each of the plurality of first search keys is stored in a file system maintained by the system, and the plurality of second index nodes comprise second location information specifying a location at which each of the plurality of second search keys is stored in the file system.

A computer-readable storage medium having program instructions recorded thereon that, when executed by at least one processor of a computing device, perform a method. The method includes: receiving, from a first data source, first data and a plurality of first index nodes that are generated by the first data source, each index node of the plurality of first index nodes comprising a plurality of first search keys corresponding to the first data; receiving, from a second data source, second data and a plurality of second index nodes that are generated by the second data source, each index node of the plurality of second index nodes comprising a plurality of second search keys corresponding to the second data; and combining the plurality of first index nodes and the plurality of second index nodes with an index structure maintained by the one or more servers.

In one embodiment of the foregoing computer-readable storage medium, the plurality of first index nodes and the plurality of second index nodes are received in a compressed format.

In another embodiment of the foregoing computer-readable storage medium, the method further comprises decompressing the received plurality of first index nodes and the received plurality of second index nodes before said combining.

In yet another embodiment of the foregoing computer-readable storage medium, said combining comprises: determining that an index node of the index structure and an index node of at least one of the plurality of first index nodes or the plurality of second index nodes have a size below a predetermined threshold; and merging the index node of the index structure and the index node of at least one of the plurality of first index nodes or the plurality of second index nodes.

IV. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A method implemented by one or more computing devices, comprising:
    receiving, from a first data source communicatively coupled to the one or more computing devices via a network, first data and a plurality of first index nodes that are generated by the first data source, each index node of the plurality of first index nodes comprising a plurality of first search keys corresponding to the first data;
    receiving, from a second data source communicatively coupled to the one or more computing devices via the network, second data and a plurality of second index nodes that are generated by the second data source, each index node of the plurality of second index nodes comprising a plurality of second search keys corresponding to the second data;
    combining the plurality of first index nodes and the plurality of second index nodes with an index structure maintained by the one or more computing devices by:
        determining that a first index node of the index structure and an index node of at least one of the plurality of first index nodes or the plurality of second index nodes comprise a number of duplicate search keys that exceed a predetermined threshold; and
        generating a second index node for the index structure that comprises the duplicate search keys, the second index node referencing the first index node of the index structure and the index node of at least one of the plurality of first index nodes or the plurality of second index nodes;
    receiving a search query comprising a search key;
    searching the second index node for the search key;
    responsive to determining that the search key is referenced by the second index node, traversing at least one of the first index node of the index structure or the index node of at least one of the plurality of first index nodes or the plurality of second index nodes to determine location information specifying a data block at which the search key is located; and
    retrieving and returning the search key from the data block via the location information responsive to the search query.

2. The method of claim 1, wherein the plurality of first index nodes and the plurality of second index nodes are received in a compressed format.

3. The method of claim 2, further comprising:
    decompressing the received plurality of first index nodes and the received plurality of second index nodes before said combining.

4. The method of claim 1, wherein the first data source encodes the first data and the second data source encodes the second data in accordance with an encoding format.

5. The method of claim 1, wherein the first data source serializes the first data and the second data source serializes the second data in accordance with one of a row-major format or a column-major format.

6. The method of claim 1, wherein the first data source filters the first data and the second data source filters the second data to remove particular data therefrom.

7. The method of claim 1, wherein the first data source formats the first data and the second data source formats the second data in accordance with at least one of a delimiter-separated value format, a JavaScript Object Notation format, or a binary format.

8. The method of claim 1, wherein the first data source is configured to constrain one or more first resources thereof that are utilized to perform at least one of:
    compression of the first data;
    encoding of the first data;
    formatting of the first data;
    filtering of the first data;
    serialization of the first data; or
    generation of the plurality of first index nodes, and
wherein the second data source is configured to constrain one or more second resources thereof that are utilized to perform at least one of:
    compression of the second data;
    encoding of the second data;
    formatting of the second data;
    filtering of the second data;
    serialization of the second data; or
    generation of the plurality of second index nodes.

9. The method of claim 1, wherein said combining further comprises:
determining that a third index node of the index structure and a fourth index node of at least one of the plurality of first index nodes or the plurality of second index nodes have a size below a predetermined threshold; and
merging the third index node of the index structure and the fourth index node of at least one of the plurality of first index nodes or the plurality of second index nodes.

10. The method of claim 1, wherein the plurality of first index nodes comprises first location information specifying a location at which each of the plurality of first search keys is stored in a file system maintained by the one or more computing devices, and
wherein the plurality of second index nodes comprises second location information specifying a location at which each of the plurality of second search keys is stored in the file system.

11. A system, comprising:
at least one processor circuit; and
at least one memory that stores program code configured to be executed by the at least one processor circuit, the program code comprising:
an index generator configured to:
receive, from a first data source communicatively coupled to the system via a network, first data and a plurality of first index nodes that are generated by the first data source, each index node of the plurality of first index nodes comprising a plurality of first search keys corresponding to the first data;
receive, from a second data source communicatively coupled to the system via the network, second data and a plurality of second index nodes that are generated by the second data source, each index node of the plurality of second index nodes comprising a plurality of second search keys corresponding to the second data; and
combine the plurality of first index nodes and the plurality of second index nodes with an index structure maintained by the system by:
determining that a first index node of the index structure and an index node of at least one of the plurality of first index nodes or the plurality of second index nodes comprise a number of duplicate search keys that exceed a predetermined threshold; and
generating a second index node for the index structure that comprises the duplicate search keys, the second index node referencing the first index node of the index structure and the index node of at least one of the plurality of first index nodes or the plurality of second index nodes;
a query processor configured to:
receive a search query comprising a search key;
search the second index node for the search key;
responsive to determining that the search key is referenced by the second index node, traverse at least one of the first index node of the index structure or the index node of at least one of the plurality of first index nodes or the plurality of second index nodes to determine location information specifying a data block at which the search key is located; and
retrieve and return the search key from the data block via the location information responsive to the search query.

12. The system of claim 11, wherein the plurality of first index nodes and the plurality of second index nodes are received in a compressed format.

13. The system of claim 12, wherein the index generator is further configured to:
decompress the received plurality of first index nodes and the received plurality of second index nodes before said combining.

14. The system of claim 11, wherein the index generator is configured to combine the plurality of first index nodes and the plurality of second index nodes with a fourth index structure maintained by the system by:
determining that a third index node of the index structure and an index node of at least one of the plurality of first index nodes or the plurality of second index nodes have a size below a predetermined threshold; and
merging the third index node of the index structure and the fourth index node of at least one of the plurality of first index nodes or the plurality of second index nodes.

15. The system of claim 11, wherein the plurality of first index nodes comprises first location information specifying a location at which each of the plurality of first search keys is stored in a file system maintained by the system, and
wherein the plurality of second index nodes comprises second location information specifying a location at which each of the plurality of second search keys is stored in the file system.

16. A computer-readable storage medium having program instructions recorded thereon that, when executed by at least one processor of a computing device, perform a method, the method comprising:
receiving, from a first data source communicatively coupled to the computing device via a network, first data and a plurality of first index nodes that are generated by the first data source, each index node of the plurality of first index nodes comprising a plurality of first search keys corresponding to the first data;
receiving, from a second data source communicatively coupled to the computing device via the network, second data and a plurality of second index nodes that are generated by the second data source, each index node of the plurality of second index nodes comprising a plurality of second search keys corresponding to the second data;
combining the plurality of first index nodes and the plurality of second index nodes with an index structure maintained by the computing device by:
determining that a first index node of the index structure and an index node of at least one of the plurality of first index nodes or the plurality of second index nodes comprise a number of duplicate search keys that exceed a predetermined threshold; and
generating a second index node for the index structure that comprises the duplicate search keys, the second index node referencing the first index node of the index structure and the index node of at least one of the plurality of first index nodes or the plurality of second index nodes;
receiving a search query comprising a search key;
searching the second index node for the search key;
responsive to determining that the search key is referenced by the second index node, traversing at least one of the first index node of the index structure or the index node of at least one of the plurality of first index nodes or the plurality of second index nodes to determine location information specifying a data block at which the search key is located; and retrieving and returning the search key from the data block via the location information responsive to the search query.

17. The computer-readable storage medium of claim 16, wherein the plurality of first index nodes and the plurality of second index nodes are received in a compressed format.

18. The computer-readable storage medium of claim 17, decompressing the received plurality of first index nodes and the received plurality of second index nodes before said combining.

19. The computer-readable storage medium of claim 16, wherein the first data source encodes the first data and the second data source encodes the second data in accordance with an encoding format.

20. The computer-readable storage medium of claim 16, wherein the first data source serializes the first data and the second data source serializes the second data in accordance with one of a row-major format or a column-major format.

\* \* \* \* \*